(12) United States Patent
Baumgartner

(10) Patent No.: US 10,518,645 B2
(45) Date of Patent: Dec. 31, 2019

(54) REGENERATIVE DRIVE SYSTEM

(71) Applicant: KNORR-BREMSE Systeme fuer Nutzfahrzeuge GmbH, Munich (DE)

(72) Inventor: Johann Baumgartner, Moosburg (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 218 days.

(21) Appl. No.: 15/553,468

(22) PCT Filed: Feb. 17, 2016

(86) PCT No.: PCT/EP2016/053309
§ 371 (c)(1),
(2) Date: Aug. 24, 2017

(87) PCT Pub. No.: WO2016/135013
PCT Pub. Date: Sep. 1, 2016

(65) Prior Publication Data
US 2018/0244156 A1 Aug. 30, 2018

(30) Foreign Application Priority Data
Feb. 25, 2015 (DE) .......................... 10 2015 102 711

(51) Int. Cl.
*B60L 7/10* (2006.01)
*B60K 7/00* (2006.01)
(Continued)

(52) U.S. Cl.
CPC .............. *B60L 7/10* (2013.01); *B60K 7/0007* (2013.01); *B60K 17/043* (2013.01); *F16H 23/02* (2013.01);
(Continued)

(58) Field of Classification Search
CPC .......... B60L 7/10; H02N 2/006; H02N 2/123; H02N 2/009; H02N 2/005; F16H 23/10; F16H 23/02; B60K 17/043; B60K 7/0007
See application file for complete search history.

(56) References Cited

U.S. PATENT DOCUMENTS 5,763,980 A 6/1998 Li
7,081,699 B2 * 7/2006 Keolian ................ H01L 41/113
310/306
(Continued)

FOREIGN PATENT DOCUMENTS

DE 41 10 468 A1 10/1992
DE 41 10 638 A1 10/1992
(Continued)

OTHER PUBLICATIONS

International Search Report (PCT/ISA/210) issued in PCT Application No. PCT/EP2016/053309 dated May 20, 2016 with English translation (eight pages).
(Continued)

*Primary Examiner* — Patrick H Mackey
(74) *Attorney, Agent, or Firm* — Crowell & Moring LLP

(57) ABSTRACT

A regenerative drive system for generating a rotary movement, which is in the form of a direct hub drive and includes an electric machine that works on the piezoelectric principle, more particularly in the form of a swash plate motor is provided. The drive system can be fitted in vehicles such as box trucks, truck tractors and trailer vehicles.

63 Claims, 6 Drawing Sheets

(51) Int. Cl.
*H02N 2/00* (2006.01)
*H02N 2/10* (2006.01)
*B60K 17/04* (2006.01)
*F16H 23/02* (2006.01)
*F16H 23/10* (2006.01)
*H02N 2/12* (2006.01)

(52) U.S. Cl.
CPC ............ *F16H 23/10* (2013.01); *H02N 2/006* (2013.01); *H02N 2/009* (2013.01); *H02N 2/105* (2013.01); *H02N 2/123* (2013.01); *B60K 2007/0038* (2013.01); *B60K 2007/0092* (2013.01); *B60L 2200/28* (2013.01); *B60L 2200/36* (2013.01); *B60L 2220/50* (2013.01)

(56) References Cited

U.S. PATENT DOCUMENTS

| | | | | |
|---|---|---|---|---|
| 7,638,929 | B2* | 12/2009 | Richter | F16D 65/18 310/311 |
| 8,410,662 | B2* | 4/2013 | Richter | F16D 55/2245 310/323.02 |
| 9,994,117 | B2* | 6/2018 | Huff | B60L 53/53 |
| 2003/0177642 | A1 | 9/2003 | Bax | |
| 2009/0211824 | A1 | 8/2009 | Knoblauch et al. | |
| 2013/0009469 | A1* | 1/2013 | Gillett | H02J 3/30 307/25 |
| 2013/0192910 | A1* | 8/2013 | Sayre | B25J 9/00 180/65.51 |
| 2016/0343999 | A1* | 11/2016 | Yonemura | H01M 2/0275 |

FOREIGN PATENT DOCUMENTS

| | | |
|---|---|---|
| DE | 195 38 978 C1 | 11/1996 |
| DE | 297 00 195 U1 | 2/1997 |
| DE | 199 48 224 C1 | 6/2001 |
| DE | 101 13 660 A1 | 9/2002 |
| DE | 10 2005 032 725 A1 | 1/2007 |
| DE | 10 2006 046 419 A1 | 5/2008 |
| DE | 10 2008 001 565 A1 | 11/2009 |
| DE | 10 2010 042 907 A1 | 4/2012 |
| DE | 10 2011 118 543 A1 | 5/2012 |
| DE | 10 2013 112 526 A1 | 5/2015 |
| EP | 2 306 047 A2 | 4/2011 |
| WO | WO 2011/163530 A1 | 12/2011 |

OTHER PUBLICATIONS

German-language Written Opinion (PCT/ISA/237) issued in PCT Application No. PCT/EP2016/053309 dated May 20, 2016 (six pages).

* cited by examiner

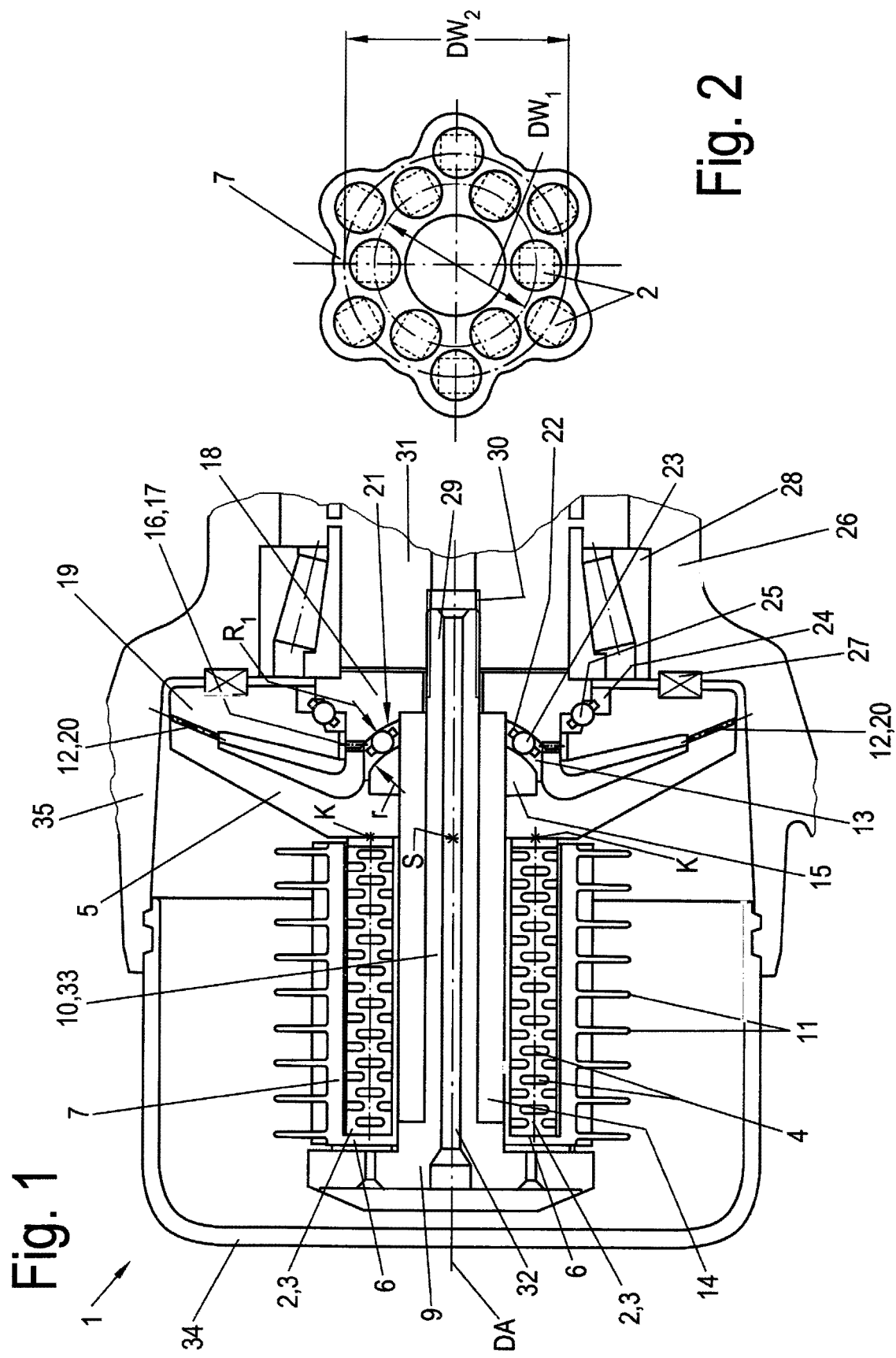

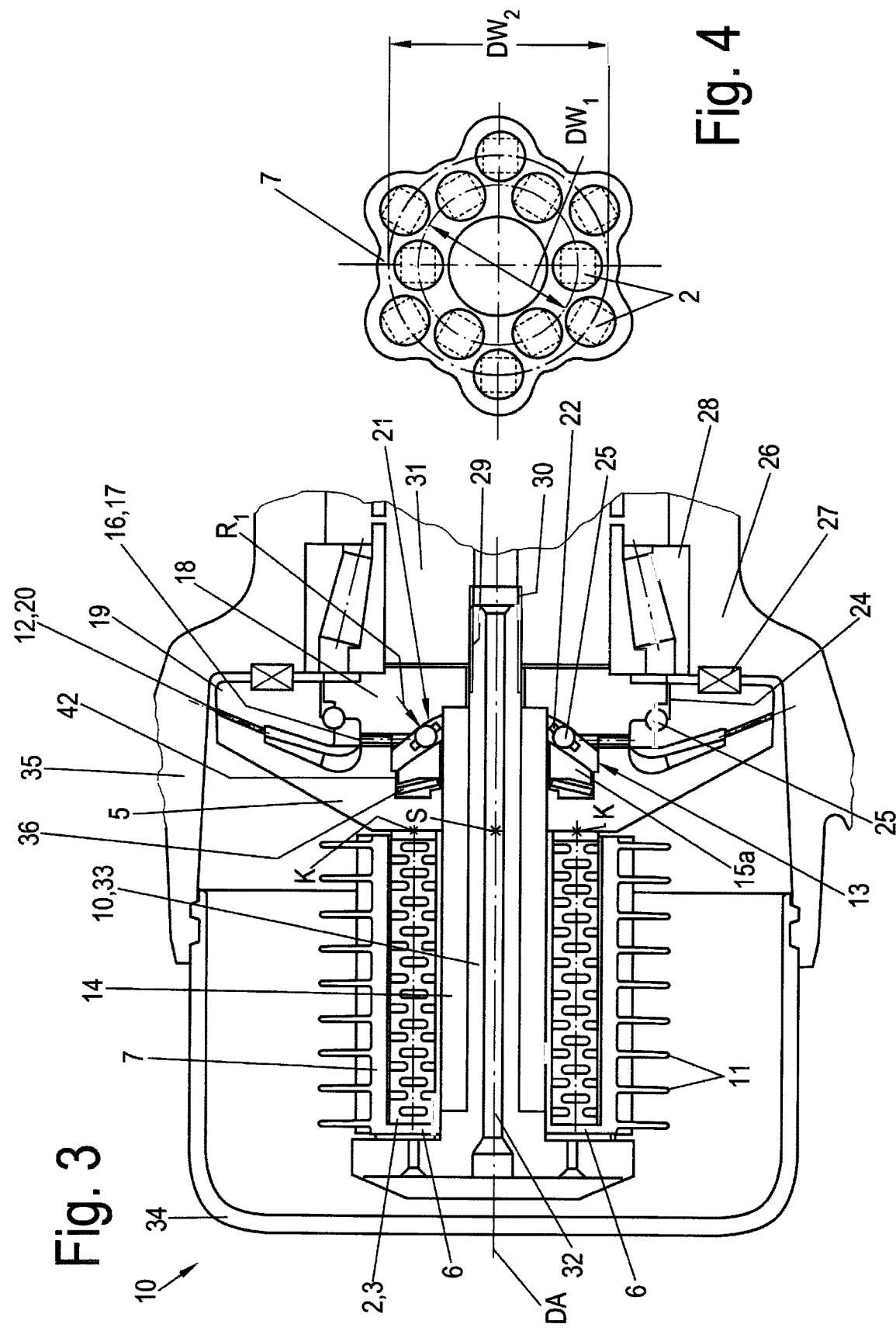

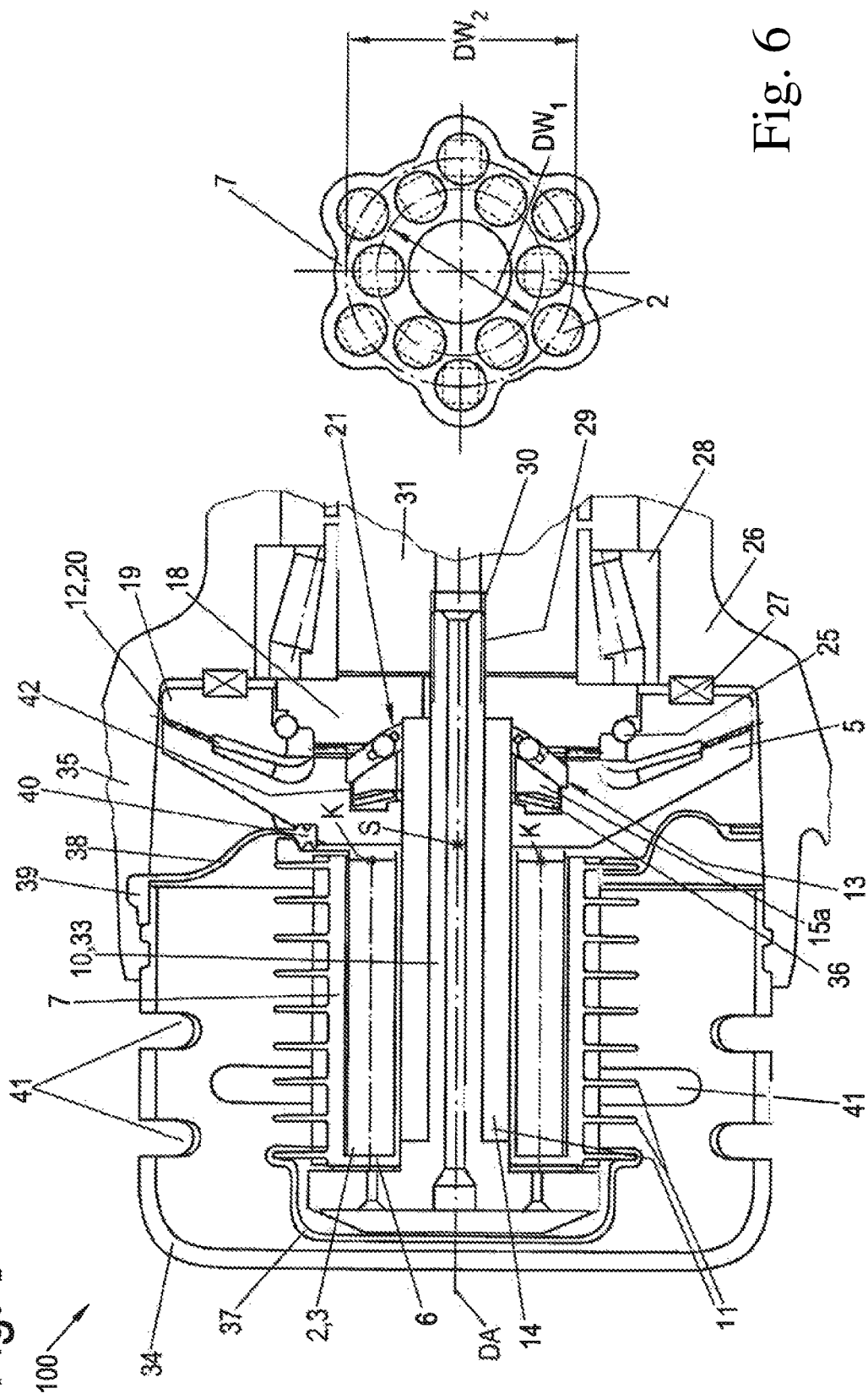

REGENERATIVE DRIVE SYSTEM

BACKGROUND AND SUMMARY OF THE INVENTION

The present invention relates to a drive apparatus with recuperation capability for generating a rotational movement, in particular for a vehicle.

Drive apparatuses with recuperation capability for vehicles are known from the prior art.

Recuperative braking is being intensively pursued in road vehicle engineering with regard to possible energy and $CO_2$ reductions. Even in the field of heavy utility vehicles, initial approaches are already being followed to utilize recuperative braking, in particular in special vehicles with a specific usage profile, such as for example refuse collection vehicles. Aside from the abovementioned saving with regard to fuel consumption and the associated $CO_2$ reduction, the additional drive power from the utilization of the stored braking energy permits smaller dimensioning of the drive assemblies (downsizing), which yields further savings.

In many conventional truck-trailer combinations used for long-distance transport, the predominant part of the overall vehicle weight is borne by the trailer vehicle. Accordingly, the assignment of the number of axles of the tractor vehicle or of the semitrailer tractor to the axles of the trailer vehicle is very commonly 2:3, in particular if, as a trailer vehicle, use is made of a semitrailer and/or a trailer for example with a fifthwheel axle, on which the drawbar is also situated, and two non-steered (rear) axles.

In that case, the trailer vehicle has not only the greater number of axles but also, at said axles, offers far more favorable conditions for the installation of the assemblies required for recuperative braking than the tractor vehicle or the semitrailer tractor has at the drive axle or the steered axle.

This concept is picked up on in DE 10 2010 042 907 A1, in which it is provided that the system for recuperation of kinetic energy has a machine which is designed to convert at least a part of the kinetic energy of the trailer during a deceleration process of the trailer. An energy store is designed to receive the converted energy from the machine, to store said energy, and to release stored energy to the machine for conversion back into kinetic energy.

It is considered to be disadvantageous that, in the disclosed solution of DE 10 2010 042 907 A1, only the vehicle trailer is equipped with a recuperation system.

If the tractor vehicle or the semitrailer tractor has additional supporting axles (leading or trailing axles), these may however be equipped, in the same way as the trailer axles, with recuperative braking devices, because leading and trailing axles are of approximately the same construction as the trailer axles.

This concept is picked up on in DE 10 2006 046 419 A1, which describes an electric drive assembly for an axle of a vehicle. In the solution presented in DE 10 2006 046 419 A1, it is provided that the axle with the electric drive assembly is, according to DE 10 2006 046 419 A1, driven exclusively by means of said electric drive assembly. An electric machine can be connected by means of a transmission device and a differential gearing to the drive shafts of the axle. Thus, the electric machine—specified here as being of a conventional type of construction as a rotating-field or traveling-field machine—is arranged between the wheels of the axle or of the vehicle.

In DE 10 2006 046 419 A1, recuperation operation is also possible, for example by means of an energy store of the electric drive assembly.

However, in utility vehicles, which even nowadays still predominantly have rigid axles, said solution necessitates a modification of the axle system. Here, the axle tube diameter must be dimensioned to be large enough that a generator for both wheels, or in each case one generator per wheel, can be installed in the cavity of the axle tube. The drive is then correspondingly realized by means of drive shafts to the vehicle wheel. The transmission gearing may be arranged in the wheels or in the axle body. The axle may be dismountable for the purposes of allowing access to the electric machine, or, during the final assembly process, may be closed off by welding with the electric machine installed. Then, however, there is no possibility of the electric machine being exchanged.

As an alternative to the arrangement of an electric machine in the axle tube of the rigid axle of a utility vehicle, an arrangement as a wheel hub drive, for example via a gearing, is also conceivable.

DE 41 10 638 A1 describes an electric hub drive for tractor vehicles, wherein a wheel hub shaft, which is driven by a motor armature of an electric machine via a planetary gearing, bears a rotating part of a disk brake on that side of the motor housing which is situated opposite the wheel flange. A recuperation capability, or devices or means for that purpose, is/are not specified in DE 41 10 638 A1.

Here, however, the arrangement of the electric machine in a conventional type of construction as a rotating-field or traveling-field machine with correspondingly heavy coils for generating a rotating or traveling field in the region of the wheel is considered to be disadvantageous, because the hub drive according to DE 41 10 468 A1 greatly increases the unsprung masses of a tractor vehicle, and thus the driving dynamics characteristics and thus also the driving safety of the tractor vehicle can be adversely affected.

A direct drive of the wheel hub is alternatively also conceivable.

As an example of this, reference is made to DE 199 48 224 C1, which describes a vehicle with at least one wheel hub, which is mounted so as to be rotatable relative to the vehicle about a wheel axis, and with one or more wheels fastened to the wheel hub by means of a wheel rim. An electric machine which has a rotor arranged around a common machine axis and which has a stator, wherein the rotor is connected at least indirectly to the wheel hub and is a hollow body which is connected directly to the wheel rim and/or to the wheel hub, are specified.

By means of the design of the rotor as a hollow body, it is possible for a drive shaft of a conventional drive, for example of an internal combustion engine, to be led through the passage of the rotor, such that the electric machine can be activated or deactivated at any time, because the electric machine exerts a torque directly, that is to say without an additional hub drive shaft etc., on the wheel to be driven. A recuperation capability, or devices or means for that purpose, are not described in DE 199 48 224 C1.

Here, it is also considered to be disadvantageous that the electric machine, in this case in a conventional type of construction as a rotating-field or traveling-field machine, by means of correspondingly heavy coils for generating a rotating or traveling field in the region of the wheel, greatly increases the unsprung masses of a tractor vehicle, and thereby adversely affects the driving dynamics characteristics and thus also the driving safety of the tractor vehicle.

A concept of a drive apparatus with recuperation capability suitable for use in such road-going vehicles could furthermore be configured such that the axles of the trailer vehicle impart the predominant fraction of the recuperative braking work and the recovered (electrical) energy is stored in the trailer vehicle.

It is furthermore conceivable for the tractor vehicle to be equipped with an electric machine rather than a retarder, ideally at the drive location of the latter, which electric machine likewise imparts recuperative braking work and can also output corresponding drive power. Here, it is assumed that the entire permanent-braking power of the recuperative devices of tractor vehicle and trailer vehicle render the retarder superfluous. The omission of the retarder and of its required heat exchanger device can on its own greatly compensate the additional costs for the recuperative braking system.

With regard to the drive in the trailer vehicle, legal regulations must be observed. To ensure driving stability, suitable coupling force regulation is required, by means of which it is ensured that the trailer does not under any circumstances run up onto the tractor vehicle or onto the semitrailer tractor, that is to say the tractor vehicle or the semitrailer tractor still imparts a minimum traction force under all circumstances.

This concept is likewise picked up on in DE 10 2010 042 907 A1.

The controller of the recuperation system according to DE 10 2010 042 907 A1 is designed to control the machine such that the machine converts kinetic energy for being received by the energy store to a degree which correlates with the extent to which the thrust force of the trailer vehicle effects a compression of an overrunning brake coupling. The degree of energy conversion may in this case be proportional to the force.

In particular, the recuperation may be implemented to an extent which is set to be proportional to the braking action of an additional service brake, such as for example a retarder.

It is however considered to be disadvantageous that, according to the solution of DE 10 2010 042 907 A1, only the vehicle trailer is equipped with a recuperation system.

It is also conceivable that the controller of a drive apparatus with recuperation capability, in interaction with an energy store for vehicles, operates, as it were, with predictive energy management in a manner dependent on the route to be traveled, such that, at all times, sufficient recuperative energy is available for the respective route in order to generate a maximum energy saving for a conventional drive of the vehicle from the route covered.

This concept is picked up on in DE 10 2011 118 543 A1. A state of charge of an energy store resulting from control or regulation of the drive apparatus with recuperation capability is predictively controlled or regulated in a manner dependent on an upcoming route, on the predicted recoverable electrical energy on said route, and/or on a predicted energy requirement for a secondary drive function.

It is however considered to be disadvantageous that the predictive control or regulation is provided only for a "conventional" hybrid drivetrain, that is to say for an internal combustion engine which is coupled directly or via a gearing to an electric machine. DE 10 2011 118 543 A1 gives no details regarding the specific design of the electric machine and regarding the use of a drive apparatus with recuperation capability at trailer axles or at axles on the vehicle which are not driven by an internal combustion engine.

Furthermore, it is conceivable that, by means of such a drive apparatus with recuperation capability for vehicles, the trailer vehicle is provided with a dedicated drive, such that the trailer vehicle can be moved or maneuvered even without a tractor vehicle or semitrailer tractor. Owing to the mobile flexibility thus obtained, this yields further functions for the trailer vehicle, for example as a locally flexible or mobile store for just-in-time deliveries with multiple drop-off points at a production hall, or for the parking of the trailer vehicle on ferries, or for loading the trailer vehicle on railway carriages, or for maneuvering or launching on loading ramps.

DE 10 2008 001 565 A1 describes a trailer with at least one axle and with a fifthwheel coupling for receiving a semitrailer. Such a trailer is referred to in technical terminology as a "dolly".

For better maneuverability of a coupled-on semitrailer, it is provided that the dolly has an electric machine comprising an energy store as drive means. A recuperation capability, or devices or means for that purpose, are not described in DE 10 2008 001 565 A1. Here, it is considered to be disadvantageous that a semitrailer can be maneuvered without a tractor only in conjunction with a dolly. A dolly has however hitherto been used significantly only in conjunction with a so-called EuroCombi truck-trailer combination, wherein a EuroCombi truck-trailer combination of said type with a dolly is constructed from a three-axle tractor vehicle, the dolly and a conventional semitrailer. Such a truck-trailer combination exceeds the previously maximum admissible length of tractor-trailer combinations in almost all European countries, such that EuroCombi truck-trailer combinations of said type have hitherto been licensed for road transport only in Scandinavia, wherein in Germany, for example, they are presently only allowed to drive under test conditions on selected routes with special authorization and with a reduced admissible total weight of 40 tonnes.

The invention therefore has the object of eliminating or substantially reducing the above-described disadvantages.

It is a further object to provide an improved tractor vehicle or an improved semitrailer tractor.

Yet further objects consist in specifying a trailer vehicle and an improved truck-trailer combination.

The present invention achieves said object by means of a drive apparatus, a tractor vehicle or a semitrailer tractor, a trailer vehicle, and a truck-trailer combination, in accordance with embodiments of the invention.

Accordingly, it is provided according to the invention that the drive apparatus is in the form of a hub direct drive and has an electric machine which operates in accordance with the piezoelectric operating principle.

A tractor vehicle according to the invention or a semitrailer tractor is designed such that the wheels of the leading axle and/or the wheels of the trailing axle have the drive apparatus according to the invention.

A trailer vehicle according to the invention is equipped such that the wheels of the trailer vehicle axles of the trailer vehicle have the drive apparatus according to the invention.

A truck-trailer combination according to the invention is composed of the tractor vehicle according to the invention or the semitrailer tractor according to the invention and at least one trailer vehicle according to the invention.

The invention yields an increased overall drive power of a truck-trailer combination, which is an advantageous effect in particular on routes with ascending gradients and when increased acceleration is required. Furthermore, driving with purely electric drive is also advantageously possible by means of the drive apparatus, for example in order to permit travel in environmental zones in city centers.

The drive apparatus according to the invention also has an advantageous effect owing to the improved traction of a truck-trailer combination in the case of which the wheels of the axles of the at least one trailer vehicle and/or the leading axle and/or the trailing axle of the tractor vehicle and/or of the semitrailer tractor are each equipped with a drive apparatus. In this way, a launch aid can be realized, which has an advantageous effect, in particular in winter, with regard to the availability and the driving safety of a truck-trailer combination of said type.

Furthermore, by means of the drive apparatus according to the invention, it is advantageously possible to realize a maneuvering facility of the trailer without a tractor vehicle. In the case of a semitrailer, this is possible in particular by means of a supporting winch which has wheels on its free end. As a result of the wheels of the trailer axles being equipped with the drive apparatus, the trailer or semitrailer is made automotive, and can thus, with corresponding remote control, be moved up to loading ramps without a tractor vehicle.

Furthermore, recuperative braking can be realized by means of the drive apparatus according to the invention. Here, the toothing of the swash plate is in engagement by means of a disconnect switching function.

In conjunction with an electrical energy store which is arranged in the trailer vehicle and/or in the tractor vehicle and/or in the semitrailer tractor, the kinetic energy of the vehicle or of the truck-trailer combination can, via the wheels during braking processes and during overrun operation of the truck-trailer combination, be advantageously recovered and stored by means of the drive apparatus according to the invention.

Such a function also has an advantageous effect as a result of the increase of the overall braking power of the truck-trailer combination. Furthermore, by means of the drive apparatus, an advantageous, wear-free permanent brake is provided, which under some circumstances renders a retarder superfluous.

Furthermore, it is advantageously possible by means of such a function to prevent the trailer vehicle from running up onto the tractor vehicle or onto the semitrailer tractor.

Likewise, with the drive apparatus according to the invention, it is possible to realize a wheel-selective drive intervention or deceleration intervention. Here, the toothing of the swash plate of the drive apparatus(es) is in engagement by means of the disconnect switching function, by means of which the wheel-selective drive intervention or deceleration intervention can be realized.

Such a function advantageously yields expanded possibilities for driving stability regulation for the entire truck-trailer combination, for example for an electronic stability program (ESP) which also takes the trailer vehicle operation into consideration.

Furthermore, possibilities arise for decreasing the turning circle of the truck-trailer combination, which has an advantageous effect when traveling around rotary intersections, in particular if, as a result of partial loading or unloading of the truck-trailer combination, the center of gravity of the overall vehicle has been shifted and, accordingly, even traveling around a rotary intersection with the so-called BOKraft [German regulation on the operation of motor carriers in passenger transport] circle dimensions is associated with difficulties.

Finally, with the drive apparatus according to the invention, the swash plate can be moved out of engagement by means of the disconnect switching function, and thus a freewheel function of the drive apparatus can be realized. In this way, during relatively long phases without significant braking interventions, or without situations in which additional drive energy is required or can be advantageously used, the drive apparatus can be protected against excessive wear. Such driving states arise for example on freeway journeys on routes without steep ascending or descending gradients.

Here, it is advantageous that, by means of such a function, an additional driving resistance that would be caused by the engaged toothing of the swash plate is eliminated.

The actuators are advantageously supported on a base of an actuator housing. The swash plate preferably has a bevel-gear-like geometry and is equipped with a toothing. The effective diameter of the actuators, which act directly on the swash plate, is advantageously selected so as to be smaller than the pitch circle diameter of the swash plate toothing by a factor of up to 5, preferably by a factor of 2.5 to 3.5.

In a further advantageous design variant of the drive apparatus, the toothing of the swash plate or the toothing of the drive disk is designed such that the toothing of the drive disk has one tooth fewer than the toothing of the swash plate. This yields a significant reduction ratio.

The toothing stroke of the swash plate is advantageously selected such that the toothing stroke results in a difference in circumferential magnitude between the deflected swash plate and the swash plate in a rest position which corresponds to one tooth pitch.

In one embodiment, the at least three actuators have in each case one housing. In this way, a simple construction and simultaneous protection of the actuators are possible.

It is provided that the housing has slots in a radial circumferential direction. In this way, the housing can firstly be more lightweight and can secondly be more elastic. Furthermore, an actuator is advantageously elastically preloaded by the housing.

In one embodiment, the drive apparatus has two groups of actuators with in each case at least three actuators. Here, it is provided that the actuators of the first group have an opposite direction of action to the second group of actuators. In this way, the available structural space in a wheel hub can be advantageously utilized.

It is furthermore provided that the at least three actuators of the first group are arranged with a 120° pitch, and the actuators of the second group, which are likewise arranged with a 120° pitch, are offset by 60° in relation to the actuators of the first group. This yields as uniform a distribution as possible for the introduction of force.

For a further embodiment, it is advantageous that the two groups of actuators with in each case at least three actuators are inserted in an actuator housing, because this yields a compact construction.

Furthermore, in a further embodiment, the actuator housing has means for heat dissipation, such as for example cooling fins, on its outer wall. An effective dissipation of heat is thus possible at the source.

The actuator housing surrounds the actuators radially in each case in the manner of a housing and axially at in each case one end of the actuators. Such a construction facilitates the assembly thereof.

In a further embodiment, the actuator housing is extended through by a supporting column. Furthermore, the supporting column is extended through by a central bolt. This yields a compact construction.

For a further embodiment, the central bolt has a head part. This also contributes to a compact and simple assembly.

The central bolt has a shank, a threaded section and a passage bore. In this way, it is possible for the actuator-force-conducting components to be able to be subjected to a preload by means of the central bolt. This is advantageous because the preload can, by means of the construction, be imparted centrally.

The supporting column may be produced from a technical ceramic material. For example, the supporting column is produced from silicon carbide. This yields a particularly robust and rigid design.

The central bolt may be produced from a tempering steel of quality 10.9 or 12.9. Small tolerances can thus be achieved.

It is likewise advantageous if the actuator housing is produced from a material with low density and high modulus of elasticity. It is thus possible for the actuator housing to be produced for example from a technical ceramic material. The actuator housing may preferably also be produced from silicon carbide (SiC).

In one embodiment, the actuators of the first group act directly, and the actuators of the second group act indirectly, on the swash plate. The action may be periodic. It is also possible for the actuators to act periodically on the swash plate in accordance with a sinusoidal function which is phase-offset by 120°.

In a further embodiment, the actuators of the second group act directly, and the actuators of the first group act indirectly, on the head part of the central bolt. This action may also be periodic, or may occur periodically in accordance with a sinusoidal function which is phase-offset by 120°.

In a yet further embodiment, it is provided that the actuators of the second group are actuated, in relation to the phase position of the actuation of the actuators of the first group, so as to yield a maximum overlap of the strokes of the actuators. It is also possible for the actuators of the second group to be actuated, in relation to the phase position of the actuation of the actuators of the first group, so as to yield a maximum action of force of the actuators on the swash plate. In this way, an effective action of the actuators on the swash plate and for the drive is made possible.

The swash plate may have a spur toothing. Other types of toothing are self-evidently also possible.

In another embodiment, the swash plate is formed as a composite component. Here, the swash plate may have a swash plate body which is produced from glass-fiber-reinforced plastic (GRP). It is thus possible to achieve a high strength with simultaneously low weight.

In a yet further embodiment, the toothing of the swash plate and the toothing of the drive disk may preferably have a modulus of 0.25 to 0.7; particularly preferably a modulus of 0.35 to 0.5. An efficient transmission of power and motion is thus possible.

In a further embodiment, the drive apparatus has an anchor plate. The anchor plate may be equipped with a spur toothing. The spur toothing of the swash plate geometrically corresponds to the spur toothing of the anchor plate. The anchor plate can thus form a fixed base for the swash plate, wherein the toothings which are in engagement permit, in a simple manner, a certain degree of relative mobility of the swash plates relative to the fixed anchor plate.

In a yet further embodiment, the drive apparatus has a pivot bearing between the swash plate and the drive disk. Here, it is advantageous if the pivot bearing involves rolling contact. Friction is reduced in this way.

In a yet further embodiment, the rolling contact is formed by a component with a spherical-sector-shaped geometry, which is inserted into a stepped bore of the swash plate, and a spherical-sector-shaped depression of the drive disk, between which there is arranged a bearing cage in which rolling bearing balls are held. This yields a compact construction.

In one embodiment, a transmission of a torque between the drive disk and a wheel hub is realized by means of a freewheel-like roller-ramp system. In this way, a freewheel is formed which two functions, specifically drive of the wheel hub by means of the drive disk and drive of the drive disk by means of the wheel hub, for example during recuperation operation.

Furthermore, a part of the wheel hub which accommodates the drive apparatus is covered toward the outside by a protective cap. The protective cap is connected to a wheel hub housing. This yields a space-saving construction, which simultaneously ensures cooling of the drive apparatus, because the protective cap is situated with the latter in the lateral relative wind of the vehicle.

In a yet further embodiment, it is provided that the drive apparatus has a spring element between the base of the stepped bore of the swash plate and the component with spherical-sector-shaped geometry. The spring element may for example be a plate spring, which yields a space-saving construction.

In one embodiment, the plate spring is supported on the base of the stepped bore of the swash plate and acts with its spring force against the component with spherical-sector-shaped geometry. In this way, distinct states in different operating states of the drive apparatus are made possible.

Here, the drive apparatus may have a ring between the component with spherical-sector-shaped geometry and the plate spring.

If the protective cap has openings, a simple forced air flow for cooling the drive apparatus when the vehicle is in motion is possible.

For an advantageously simple seal, the drive apparatus may, in one variant, have a seal which surrounds the head part and which is fastened to the actuator housing.

It is also possible for the drive apparatus to have a disk-shaped seal which seals off the actuator housing on its side facing toward the swash plate, and a swash plate gearing formed from the swash plate and the drive disk, and bearing points, with respect to the surroundings.

The disk-shaped seal has, on its wheel-hub-side circumference, a seal bead by means of which the seal is fixed between the wheel hub and the protective cap. Furthermore, the disk-shaped seal may have, on its actuator-housing-side circumference, a seal bead by means of which the seal is fixed between the actuator housing and the swash plate. In this way, simple installation is possible.

In another embodiment, the functions of drive, recuperative braking and freewheeling of the drive apparatus are realized by means of the disconnect switching function. For this purpose, the drive apparatus may have a stepped switching function. The stepped switching function acts on the swash plate gearing, wherein the swash plate gearing is formed from a swash plate and a drive disk, and realizes at least two transmission ratio stages of the swash plate gearing. In this way, the drive apparatus can advantageously have three functions.

The tractor vehicle and/or the semitrailer tractor may have an energy store in which energy obtained by means of the recuperative braking by means of the drive apparatus is stored and from which stored energy is released for drive of the tractor vehicle or of the semitrailer tractor by means of the drive apparatus. Said store may for example be a vehicle battery and/or an additional battery/accumulator. It is self-evidently also possible for the trailer vehicle to have an energy store in which the energy obtained by means of the drive apparatus as a result of the recuperative braking is stored and from which stored energy is released for drive of the trailer vehicle by means of the drive apparatus.

Further advantageous embodiments of the invention will emerge from the subclaims.

BRIEF DESCRIPTION OF THE DRAWINGS

Exemplary embodiments of the subject matter according to the invention are illustrated in the drawings and will be described in more detail below. In the drawings:

FIG. 1 shows a longitudinal sectional view of an exemplary embodiment of a drive apparatus according to the invention;

FIG. 2 shows a corresponding front view of the drive apparatus according to the invention as per FIG. 1;

FIG. 3 shows a longitudinal sectional view of a design variant of a drive apparatus according to the invention;

FIG. 4 shows a corresponding front view of the design variant as per FIG. 3;

FIG. 5 shows a longitudinal sectional view of a further design variant of a drive apparatus according to the invention;

FIG. 6 shows a corresponding front view of the further design variant as per FIG. 5;

DETAILED DESCRIPTION OF THE DRAWINGS

Figure 7:
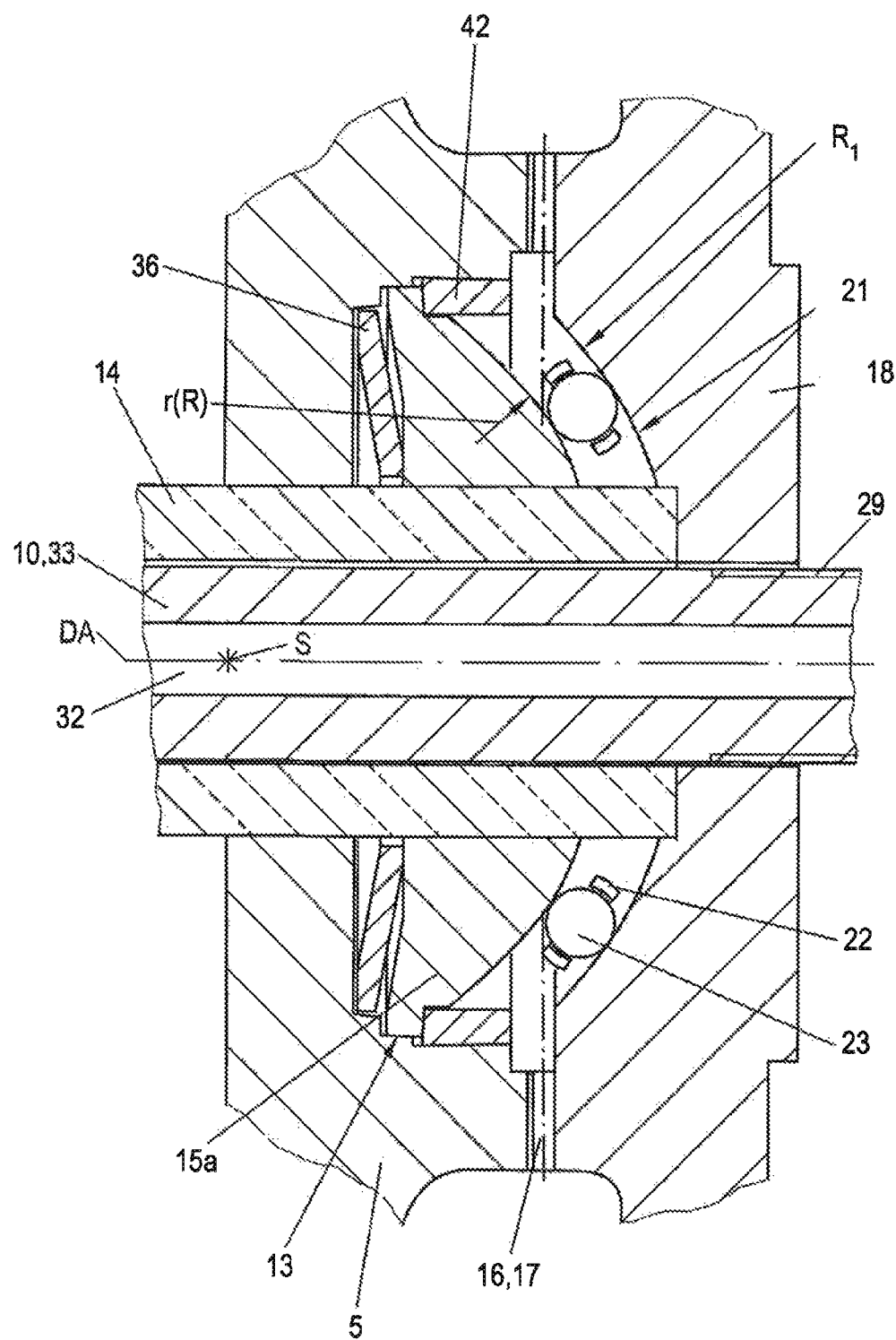
FIG. 7 shows an enlarged detail from the longitudinal sectional views in the section as per FIGS. 3 and 5.

FIG. 1 illustrates a longitudinal sectional view of an exemplary embodiment of a drive apparatus according to the invention. FIG. 2 shows a corresponding front view of the drive apparatus 1 according to the invention as per FIG. 1.

The drive apparatus 1 according to the invention is provided for generating a rotational movement and is designed with recuperation capability, and in this case has a total of 12 actuators 2, which in this case are arranged in two groups of in each case six actuators 2. Each group is arranged on a pitch circle with different diameter $DW_1$, $DW_2$ concentrically about an axis of rotation DA, in each case with a pitch of 60°. The diameters $DW_1$, $DW_2$ are furthermore also referred to as effective diameters. Here, the actuators 2 extend substantially parallel to one another and to the axis of rotation DA. The number of twelve actuators 2 is to be understood merely as an example, that is to say a drive apparatus 1 according to the invention may also have fewer or more than twelve actuators 2 or may have more than or fewer than two pitch circles. However, at least three actuators 2 are required per pitch circle. In FIG. 1, the actuators 2 are designed as piezo actuators.

An actuator 2 has one or more, in this case—purely by way of example—four piezo stacks (not illustrated here) which are each arranged in a cylindrical housing 3. A piezo stack is to be understood to mean a number of piezo elements which are arranged in a stack. Alternatively, it is also possible for fewer or more than four piezo stacks to be provided per actuator 2. The housing 3 has slots 4 which are oriented orthogonally with respect to the axis of symmetry and which are distributed over the circumference, such that the housing 3 acts as a spring in an axial direction.

The number of piezo stacks used per actuator 2, and thus also the total number of piezo stacks used, is dependent on the selected piezo stack. In the exemplary embodiment as per FIG. 1, six actuators 2 of dimensions 14×14×120 mm are used per group, wherein each actuator 2 is constructed from in each case four, accordingly series-connected piezo stacks 14×14×30 mm. Alternatively, it is also possible for 12 actuators 10×10×120 mm to be used per group, wherein then, each actuator 2 is constructed from in each case four, accordingly series-connected piezo elements 10×10×30 mm. Both configurations generate the same force and the same stroke. In the case of six actuators 2 per group, these may also be actuated in pairwise fashion, and in the case of 12 actuators 2 per group, these may also be actuated in groups of three. Individual actuation is however also possible.

Below, it is sought to demonstrate, by way of example, the working capacity per rotation $W_{UG}$ of the drive apparatus 1 and, derived from this, to determine by way of example the maximum achievable wheel torque $M_{Rt}$. This yields the required dimensions of the actuators 2.

It is the intention here to use, purely by way of example, a commercially available element with piezoelectric operating principle with 8000 N block force and a maximum idle stroke (including preload) of 48 μm with 28 mm active length. In the case of a series connection of in each case four commercially available piezo elements in one actuator 2, this yields a total working stroke of 192 μm, and a theoretical active total length of 112 mm, for an actuator 2 of said type.

The working capacity $W_0$ of an actuator 2 of said type per stroke with a utilizable total working length of 50% of the theoretical active total length is calculated as follows:

$$W_0 = 8000\ N * 0.192\ mm * 0.5 = 768\ Nmm$$

In the case of two times six series-connected actuators 2, the total work $W_G$ per stroke is given by the following:

$$WG = 12 * 768\ Nmm = 9216\ Nmm = 9.216\ Nm$$

Assuming 160 teeth on the drive disk 12, this yields a working capacity per rotation $W_{UG}$ of the drive disk 12 of:

$$W_{UG} = 160 * 9.216\ Nm = 1474.56\ Nm$$

with $W_{UG} = M*2*\pi$, yielding a theoretical wheel torque of:

$$M_{Rt} = W_{UG}/2*\pi = 1474.56/6.28 = 234.8\ Nm$$

Taking into consideration an efficiency of 0.8, the expected wheel torque $M_R$ amounts to:

$$MR = M_{Rt} * 0.8 = 234.8\ Nm * 0.8 = 187.8\ Nm$$

An increase of the wheel torque requires a further enlargement of the cross section of the actuator 2.

Now, the initially assumed required number of teeth of the drive disk 12 can be recalculated in order, in the case of an actuation frequency of the actuators 2 of 1200 Hz, to obtain a wheel rotational speed corresponding to a traveling speed of 90 km/h.

With a dynamics wheel rolling radius $R_{dyn}$ of 0.529 m, the speed v of 90 km/h=25 m/s yields a rotational speed $f_n$ of:

$$f_n = v/(R_{dyn}*2*\pi) = 25\ m/s/(0.529\ m*6.28) = 7.52531/s = 451.521/min$$

With a maximum admissible actuation frequency $f_{max}$ for the actuators 2 of 1200 Hz and the wheel rotational speed of $f_n$=7.5253 l/s required for a maximum vehicle speed of 90 km/h, the number of teeth $z_{max}$ of the drive disk 12 is obtained as follows:

$$z_{max} = f_{max}/f_n = 1200 \text{ Hz}/7.5253 \text{ l/s} = 159.462; \text{ selected:}$$
$$z=160$$

In the case of a restriction of the field of use of the drive apparatus 1 to a vehicle speed of for example 60 km/h, the actuation frequency $f_A$ of the actuators 2 can be correspondingly reduced, or the achievable wheel torque $M_R$ can be increased with an unchanged actuation frequency $f_{max}$.

With a selected transmission ratio $i_t$=3.2 between the drive disk 12 and the swash plate 5, the actuator stroke h=0.192 mm, the factor 2, because a series connection of 2 times 6 actuators 2 is provided, the toothing stroke $h_T$ of the swash plate 5 is obtained as follows:

$$h_T = h*2*i_t = 0.192*2*3.2 = 1.2288 \text{ mm}$$

For an involute toothing, the tooth height, determined from tip circle diameter of the toothing 8 of the swash plate 5 minus base circle diameter of the toothing 8 of the swash plate 5 divided by two=2.167*modulus m of the toothing 8 of the swash plate 5. Thus, the modulus m of the toothing 8 of the swash plate 5 is calculated as follows:

$$m = h_T/2.167 = 1.2288 \text{ mm}*2.167 \text{ mm} = 0.568; \text{ selected:}$$
$$m=0.5$$

Thus, for the toothing 8 of the swash plate 5 and the toothing 12 of the drive disk 13, a modulus m is obtained which is standardized in the preferred series of DIN 780 and which can be realized using conventional manufacturing means.

With an increase of the actuator stroke h, the modulus m of the toothings 8 and 12 may possibly be increased yet further. On the other hand, the swash plate transmission ratio of $i_t$=3.2 taken as a basis is difficult to realize in the case of the diameter of the swash plate 5 that has resulted on the basis of the small modulus m. In the case of a further reduced modulus m, the difficulties in realizing such a transmission ratio "$i_t$" in as small a structural space as possible accordingly increase.

The actuators 2 of the first group, which in FIG. 1 are arranged radially at the inside, act, at the effective diameter $DW_1$, directly on a swash plate 5, whereas the reaction forces thereof are dissipated into a rear face wall 6 of an actuator housing 7. The actuators 2 of the second group, which in FIG. 1 are arranged radially at the outside, are supported on a front face wall 8 (not illustrated here) of the actuator housing 7 and act, at the effective diameter $DW_2$, on a head part 9 of a central bolt 10.

The actuators 2, with periodic actuation, preferably actuation performed periodically in accordance with a sinusoidal function which is phase-offset by in each case 120°, generate a nutating movement of the swash plate 5.

The actuator housing 7 is geometrically designed such that an arrangement of the two series-connected groups of actuators 2 is made possible. Furthermore, the actuator housing 7 is geometrically designed such that a low weight is achieved.

The actuators 2 are in each case preloaded by the housing 3. The preload of the actuators 2 is required in order that the piezo stacks are protected against external mechanical actions. The piezo stacks, which are under preload or compressive load, are thus less sensitive to external influences such as shocks, vibration loading, fluctuating ambient temperatures and high-frequency disturbances.

As a result of the preloading of the actuators 2, any play is eliminated. Thus, no stroke losses arise as a result of unnecessary play, though the preload also leads to a reduction of the utilizable stroke owing to the resulting compression of the piezo stacks.

As a result, it is for example the case that the length of a non-preloaded actuator 2 with dimensions 14×14×120 mm is reduced to a length of for example 112 mm, if every piezo element with the dimensions 14×14×30 mm is preloaded by in each case 2 mm. The possible working stroke of the actuator 2 is accordingly reduced by 48 µm, such that a remaining total working stroke of the preloaded actuator is 192 µm or 0.192 mm.

Since, during the operation of the actuators 2, a considerable generation of heat must be expected, the actuator housing 7 has means for improved heat dissipation, such as for example cooling fins 11.

The actuator housing 7 is preferably produced from a material with a high modulus of elasticity in order to minimize stroke losses of the actuators 2 owing to elastic deformation of adjacent actuator-force-conducting components, such as for example the actuator housing 7. Materials that may be used for example are technical ceramic materials, such as for example silicon carbide (SiC) with a modulus of elasticity of approximately 400,000 N/mm². Since technical ceramic materials, such as for example SiC, furthermore also exhibit a relatively high heat conductivity and relatively low thermal expansion, this group of materials is preferred for forming the actuator housing 7.

Since the actuator housing 7 is set in high-frequency motion, not only the weight-saving geometrical design but also the specific weight of the housing material is of significance for reducing inertial influences on the dynamic characteristics of the drive apparatus 1. For this reason, and also in order to reduce production costs, it is expedient for the actuator housing 7 to be formed as a composite component. Here, the housing part itself is produced, as intended, from a ceramic material, such as for example SiC, and the means for heat dissipation, such as for example the cooling fins 11, which surround the housing part are produced from a light metal, such as for example an aluminum material or a magnesium material. In this case, the housing part is connected by means of the light metal cooling structure to the actuator housing 7 by way of a metal injection molding process. Subsequent machining processes are thereby considerably simplified.

The swash plate 5 has a cylindrical envelope geometry. On the side averted from the actuator, the swash plate 5 has a rotationally symmetrical, frustoconical depression, on the outer edge of which there is situated a toothing 12. The swash plate 5 is thus similar to a bell wheel, such as is known for example from bevel gear transmissions.

The swash plate 5 furthermore has a central, stepped bore 13. The stepped bore 13 is extended through at its relatively small diameter by a central supporting column 14 (FIG. 3), which in turn is extended through by the central bolt 10, whereas the bore 13 is extended through at its relatively large diameter by a component 15 which has a spherical-sector-shaped geometry, wherein the spherical sector has a radius "r".

The swash plate 5 furthermore has a spur toothing 16 which corresponds to a spur toothing 17 of an anchor plate 18, such that the swash plate 5 is rotationally secured on the positionally fixed anchor plate 18 by means of the spur toothing 16, 17. A nutating movement of the swash plate 5 is however permitted within the spur toothings 16, 17. The spur toothing 16, 17 may for example be in the form of a flat-notch toothing or in the form of a Hirth toothing.

The drive apparatus 1 furthermore has a drive disk 19 which is arranged coaxially with respect to the swash plate 5, wherein the drive disk 19 is arranged on that side of the swash plate 5 which is averted from the actuators. The drive disk 19 furthermore has a cylindrical envelope geometry. On the side facing toward the actuators, the drive disk 19 has a rotationally symmetrical frustum, which corresponds to the frustoconical depression of the swash plate 5. The outer edge of the frustum or of the drive disk 19 has a toothing 20. The drive disk 19 is thus similar to a bevel gear such as is known from bevel gear transmissions. During the operation of the drive apparatus, the toothing 20 engages at least in sections into the corresponding toothing 12 of the swash plate 5.

The drive disk 19 furthermore has a central, stepped bore 24 which receives the anchor plate 18. The anchor plate 18 has a spherical-sector-shaped depression 21 on its side facing toward the actuators. The spherical-sector-shaped depression 21 in the anchor plate 18 has a radius R1. The spherical-sector-shaped depression 21 has a spherically curved bearing cage 22 in which rolling bearing balls 23 are held. The rolling bearing balls 23 are in this case arranged in ring-shaped fashion in the bearing cage 22. The bearing cage 22 may optionally also have a rolling bearing ball 23 in its center.

Figure 8:
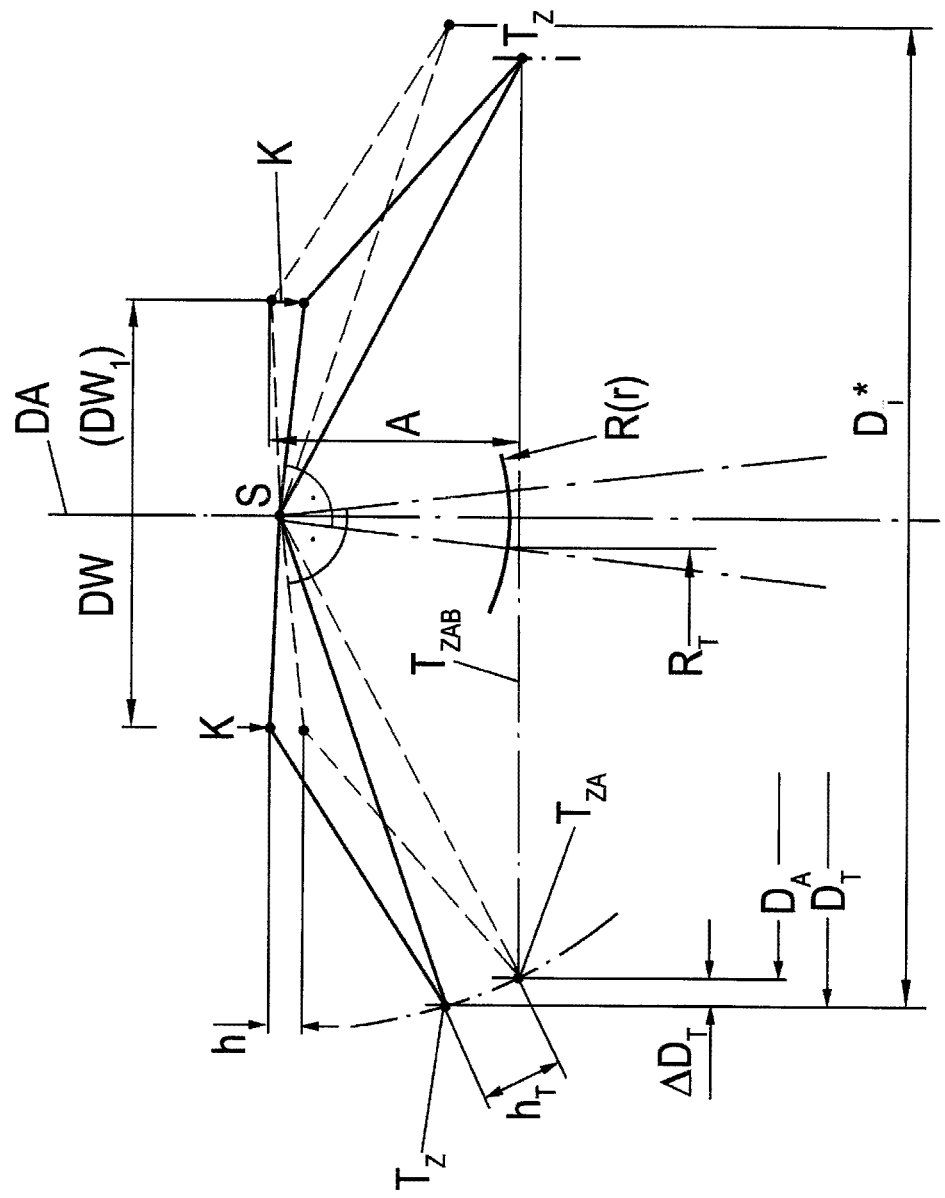
FIG. 8 shows a kinematics diagram of the exemplary embodiment of the drive apparatus according to the invention.

The radius R1 of the spherical-sector-shaped depression 21 in the anchor plate 18—minus the diameter of the rolling bearing balls 23—yields the kinematic effective radius R. The radius R is, in terms of magnitude, equal to the radius r on the spherical-sector-shaped component 15. These geometrical conditions are shown in FIG. 8.

The spherical-sector-shaped geometrical elements 15, 21 thus interact by means of the bearing cage 22 and the rolling bearing balls 23, such that a pivot bearing or rolling contact, hereinafter referred to as swash bearing, is formed. During movement of the swash plate 5, the spherical sector of the component 15 rolls, in accordance with the pivot angle of the swash plate 5, on a small pitch circle which is represented by the rolling bearing balls 23 arranged in ring-shaped fashion. The central point of the two radii r and R ideally lies in the same radial plane as the force introduction points K (see FIG. 8) of the actuators 2 on the swash plate 5, such that a torque-free introduction of force into the swash plate 5 is realized. The swash bearing thus formed surrounds the supporting column 14.

The component 15 with spherical-sector-shaped geometry is integrated into the swash plate 5, whereas the anchor plate 18 with the spherical-sector-shaped depression 21 is arranged in the drive disk 19 in order to permit a simple construction and a problem-free introduction of force from the actuators 2 into the swash plate 5. By means of this measure, the pivot center S is formed in the region of the swash plate 5 and can be selected, with regard to its position, such that undesired transverse movements at the force introduction point K of the actuators 2 into the swash plate 5 are substantially prevented (in this regard, see also FIG. 8).

A further advantage of this position of the pivot center S consists in that targeted transverse movements can be generated in the region of the toothing 12 of the swash plate 5, because, with the described selection of the position of the pivot center S, the underlying lateral pivoting movement permits the required enlargement of the toothing pitch circle relative to that of the drive disk 19 by at least one tooth in the toothing 12, 20.

In order to reduce the inertia forces, the swash plate 5 should be as lightweight as possible and, secondly, in order to limit the deformations that occur, said swash plate should be as rigid as possible. Since steel is required at least in the region of the swash bearing and possibly also in the toothing 12 of the swash plate 5, a composite component would appear to be suitable for realizing the stated requirements. In the case of a composite part composed of glass-fiber-reinforced plastic (GRP), the toothing 12 of the swash plate 5 may possibly be formed from a suitable plastic.

The deformation of the swash plate 5, like the bending-up of the head part 9 of the central bolt 10, is partially automatically compensated. The maximum force and thus the most intense deformation occur in the range of small actuator strokes and high actuator forces. Owing to the deformation, at such an operating point of the actuators 2, the clamping force of the central bolt 10 is reduced slightly in accordance with the deformation. In this phase, a part of the actuator energy is stored in the elastic deformation of the force-absorbing components 7, 10, 14, 18. If, during the further run-through of the "actuator undulation" on the swash plate 5, the re-expansion of the deformed components 7, 10, 14, 18 occurs owing to the then decreasing clamping force, then in said region, the clamping force of the central bolt 10 and also the stroke are correspondingly increased, and thus the stored actuation energy is released.

Here, the expression "actuator undulation" refers to the engagement of the toothing 12 of the swash plate into the toothing 20 of the drive disk 19, which engagement periodically repeats, takes effect and abates again at one location of the toothing 12 of the swash plate 5 during every rotation.

The drive disk 19 is supported on the anchor plate 18 via a rolling bearing 25. It is alternatively also possible for the drive disk 19 to be connected directly to a wheel hub 26. The support on the anchor plate 18 is however necessary in order that the small spacing tolerances, required owing to the small actuator strokes, of the toothings 12, 20 of the swash plate 5 and drive disk 19 can be adhered to. Furthermore, the drive disk 19 is connected in torque-transmitting fashion to the wheel hub 26. The transmission of a torque between the drive disk 19 and the wheel hub 26 is performed by means of a freewheel-like roller-ramp system 27. The wheel hub 26 is rotatable relative to the anchor plate 18 by means of a tapered-roller bearing 28, and the anchor plate 18 is positionally fixed and cannot corotate. Said anchor plate, with its spur toothing 17 and the spur toothing 16, in engagement with the spur toothing 17, of the swash plate 5, forms the fixed base for said swash plate.

The toothing 12 of the swash plate 5 and the toothing 20 of the drive disk 19 are for example designed such that the toothing 20 of the drive disk 19 has one tooth fewer than the toothing 8 of the swash plate 5. This thus yields a significant reduction ratio. The kinematic relationships in this regard are illustrated by way of example in FIG. 7 and will be discussed in more detail further below. During one cycle of the nutating movement of the swash plate 5, which is secured against rotation by means of the spur toothing 16, 17 by the anchor plate 18, the drive disk 19 is thus rotated at least one tooth pitch further about the swash plate 5. In the case of a difference in number of teeth of two or three teeth, the extent to which the drive disk 19 is rotated further correspondingly amounts to two or three times one tooth pitch.

The positionally fixed anchor plate 18 is supported on an inner ring of the tapered-roller bearing 28 of the wheel hub 26. The supporting column 14 is also supported on the anchor plate 18. By means of the central bolt 10, the threaded section 29 of which engages into a corresponding threaded bore 30 of an axle body 31, the stationary part of the drive apparatus 1, composed of anchor plate 18, supporting column 14 and actuator housing 7, is braced by the central bolt 10 against the inner ring of the tapered-roller bearing 28 and thus against the stationary axle body 31. The clamping force generated by the central bolt 10 is dimensioned such that, in this way, the required preload of the tapered-roller bearing 28 of the wheel hub 26 is also generated.

The supporting column 14 is preferably produced from a material with a high modulus of elasticity and high compressive strength. What would appear to be particularly suitable here are materials from the group of technical ceramic materials, such as for example silicon carbide (SiC) with a modulus of elasticity of approximately 400,000 N/m$^2$ and a compressive strength of approximately 1500 MN/m$^2$.

In conjunction with the central bolt 10, which is advantageously produced from a high-strength tempered steel material and accordingly has the quality 10.9 or 12.9, and a high preload force of the central bolt 10, which is also necessary for a required preload of the rolling bearings 22, 23, 25, 28, it is thus possible to achieve the least possible deformation of the actuator-force-conducting components 7, 10, 14, 18 and thus the least possible stroke loss of the actuators 2 as a result of possible elastic component deformation during the activation of the actuators 2.

The central bolt 10 has a passage bore 32 which permits a leadthrough of cables from the stationary axle body 31 to the actuators 2 which are accommodated in the actuator housing 7 surrounding the supporting column 14, for the purposes of a supply and discharge of voltage to and from said actuators. The head part 9 of the central bolt 10 absorbs the reaction force generated by the actuators 2 and dissipates the reaction force into the shank 33 of the central bolt 10 and ultimately into the threaded section 29 of the central bolt 10 and thus into the axle body 31. The head part 9 is, in FIG. 1, formed integrally with the shank 33 and with the threaded section 29 of the central bolt 10. Also conceivable, however, is a two-part form, in which a disk-shaped support plate is arranged under a bolt head.

Below, by way of example, the design of the supporting column 14 and of the central bolt 10 will be presented with regard to the least possible elastic deformation of the two components under load and thus the least possible stroke losses for the actuators.

Stroke losses as a result of the elastic deformations that occur under the high actuator forces arise substantially
a) as a result of elastic length expansion of the central supporting column 14, and
b) as a result of elastic bending-up of the head part 9 of the central bolt 10.

For the supporting column 14, an outer diameter of 45 mm and an inner diameter of 16 mm and a length of 110 mm are preselected. The modulus of elasticity of the selected material silicon carbide is 400,000 Nmm$^2$, and the compressive strength thereof is 1200 MNmm$^2$. For the central bolt 10, an outer diameter of 16 mm and an inner diameter of 6 mm and a length of 150 mm are preselected. The modulus of elasticity of the selected strength class of 10.9 is 206,000 Nmm$^2$.

To determine the required preload force of the predimensioned central bolt 10, it is assumed that the effective actuator force amounts to 50% of the maximum force of all six actuators 2 which act directly on the swash plate 5. Since the introduction of force however takes place highly eccentrically and thus gives rise to a non-uniform expansion of the actuator-force-absorbing components 10, 14, the maximum expansion with the full actuator force of all six actuators 2 of 48 kN is assumed for the estimation.

The central bolt 10 with the shank cross-section of 126.4 mm$^2$ is preloaded to 800 N/mm$^2$. This preload yields, at the supporting column 14, a compressive stress of 72.81 N/mm$^2$ and, with the above-mentioned data for modulus of elasticity and the length of the supporting column 14, an elastic compression of 0.02 mm.

From a bolt preload diagram, such as can be found in the relevant technical literature with regard to bolt calculation, the above-mentioned data for the supporting column 14 and the central bolt 10 under the maximum load of 48 kN yield a recovery of 0.01 mm of the supporting column 14 which has been compressed by 0.02 mm.

Since the actual load is lower by a factor of 2 but is introduced eccentrically, the stroke loss at the supporting column 14 can be assumed to be between 0.005 mm and 0.01 mm.

Further stroke losses are to be expected in the elastic bending-up of the head part 9 of the central bolt 10 and in the deformation of the swash plate 5. The head part 9 is expediently formed in one piece with the central bolt 10, because the supporting column 14, owing to the selected material silicon carbide, reacts sensitively to notch and bending stress. The bending-up of the head part 9 is, as a rough estimate, assumed as being 2 μm.

It is thus possible, through corresponding material selection for the actuator-force-conducting components 7, 10, 14, 18 and a correspondingly dimensioned preload of the components 7, 14, 18 by the central bolt 10, for the stroke loss of the actuators 2 as a result of elastic deformation of the actuator-force-conducting components 7, 14, 18 to be minimized.

By virtue of all of the components of the drive apparatus 1 being combined in a pre-assemblable unit, it is possible to set narrow tolerances by means of corresponding adjustment measures. It is preferable for the assignment of the component 15 situated opposite the anchor plate 18, which component has a spherical-sector-shaped geometry, to be altered for this purpose. It is for example expedient for the required toothing stroke tolerances to be set through the insertion of spacer disks (not illustrated here) of graduated thickness between a ring-shaped support surface of this component 15 and the support surface on the swash plate 5. A second possibility consists in designing the component 15 in selection series with graduated overall thickness, and for said component 15 to be assigned with a suitable overall thickness in order to set the tolerances after a measurement process.

FIG. 8 illustrates a kinematics diagram of an exemplary embodiment of the drive apparatus according to the invention. The movement of the swash plate 5 occurs proceeding from the pivot center S of the swash plate 5 and an assumed effective diameter DW on which, in this case, the actuators 2 of the first group are arranged substantially axially parallel to the axis of rotation DA of the drive apparatus 1. The effective diameter DW is in this case smaller than the pitch circle diameter $D_T$ of the toothing 8 by a factor of 1.5 to 5, preferably by a factor of 2.5 to 3.5.

An effective working stroke h of the actuators 2 of in each case 0.080 mm is assumed, along with an effective diameter DW of the actuators 2 of 14 mm, such that the force action point K of the actuators 2 is thus at a distance of 7 mm from the pivot center S of the swash plate 5.

The geometry of the swash plate 5 is furthermore configured such that a respective working stroke h of the actuators 2 results in a linearized toothing stroke $h_T$ of 2.7×h.

This results in a difference of the pitch circle diameters of $\Delta D_T=1.25\times h$. A working stroke h of the actuators 2 of 0.080 mm thus yields $\Delta D_T=0.10$ mm and $h_T=0.216$ mm.

The difference of the pitch circle diameters $\Delta D_T=0.10$ mm yields a difference in the circumferential magnitude $\Delta U_T$ of the deflected swash plate 5 in relation to the swash plate 5 in a rest position of $\Delta U_T=0.314$ mm. Thus, the pitch for the dimensioning of the toothings 12 and 20 is fixed if the toothing 20 of the drive disk 19 is to have one tooth fewer than the toothing 12 of the swash plate 5.

If, in an exemplary case, one selects a value of $\Delta U_T=0.30$ mm and a modulus m of 0.1, which can be realized with conventional manufacturing means and which is standardized in the preferred series of DIN 780, this accordingly yields an effective circumference $U_T$, in terms of toothing kinematics, of the swash plate 5 of 98.910 mm and an effective circumference $U_A$, in terms of toothing kinematics, of the drive disk 12 of 98.596 mm, and accordingly a pitch circle diameter $D_T$ of the swash plate 5 of 31.50 mm and a pitch circle diameter $D_A$ of the drive disk of 31.40 mm. As a result, the swash plate 5 is provided with a toothing 12 with 315 teeth, and the drive disk 19 is provided with a toothing 20 with 314 teeth. This ratio of number of teeth yields, in this case, a transmission ratio of 315:1.

The relatively large toothing stroke $h_T=0.216$ mm at the outer edge of the swash plate 5 has the effect that a toothing 12 or 20 for torque transmission or conversion can be used which can be realized using conventional manufacturing means and can thus be produced inexpensively.

The above configuration of the kinematics and of the toothing 12 or 20 yields, for example in the case of a nutation frequency of $f_{max}=640$ l/s, a maximum drive rotation speed of the drive apparatus 1 $n_{max}$ of 120 l/min and a maximum torque $M_{max}$ of 8 Nm of the drive apparatus 1. Thus, the drive apparatus kinematically configured by way of example in FIG. 8 can be used as a drive apparatus 1 with recuperation capability for generating a rotational movement in utility vehicles.

The toothing stroke $h_T$ and, corresponding thereto, the difference of the pitch circle diameters $\Delta D_T$ can be influenced by changing the spacing A from the pitch circle plane $T_{ZAB}$ of the drive disk 19 to the pivot center S of the swash plate 5 and can thus be adapted by means of the geometrical design of the swash plate 5 to different structural space conditions.

The expression pitch circle plane $T_{ZAB}$ refers to the plane which spans the pitch circle diameter $D_A$ of the drive disk 19.

That part of the wheel hub 26 which receives the drive apparatus 1 is covered toward the outside by a protective cap 34. The protective cap 34 is in this case, purely by way of example, connected in positively locking and non-positively locking fashion to a wheel hub housing 35 by means of a deformation process. The structural space of the drive apparatus 1 including protective cap 34 is in this case selected so as to be identical to, or at least approximately at the same size as, an external planetary gearing of a driven utility vehicle rigid axle.

The drive apparatus 1 can thus be installed particularly advantageously as a hub direct drive in the free space in the wheel-rim nave or in the free space of the wheel disk without structural space problems on non-driven utility vehicle axles, in particular on trailer axles and on leading and trailing axles of tractor vehicles or semitrailer tractors, without increasing the vehicle width or impeding the mounting and dismounting of the wheels.

Furthermore, the mass of the drive apparatus 1 according to the invention with actuators which operate in accordance with the piezoelectric operating principle and with a swash plate gearing is significantly lower than that of an electric machine of equal power which operates in accordance with the rotating-field or traveling-field operating principle, because the drive apparatus 1 according to the invention requires no heavy coils for generating a rotating field or traveling field. In this way, the unsprung masses of a utility vehicle which is equipped with the drive apparatuses 1 according to the invention are increased only slightly in relation to electric machines with a different operating principle than that of the piezoelectric effect. Accordingly, the driving characteristics and the driving safety of a utility vehicle of said type are not significantly restricted.

The drive apparatus 1 is required for recuperative braking and, in specific situations, as a wheel drive. During most of the period of use of a vehicle, the drive apparatus 1 should however be switched into a disconnected state so as not to give rise to any additional drag torques or unnecessary wear of the components of the drive apparatus 1.

Switching into a disconnected state, or freewheeling, in only one loading direction, braking or driving, could self-evidently be realized for example by means of a conventional freewheel, but because both loading directions must be actively activatable and deactivatable, a switching function is necessary.

Such a disconnect switching function is provided under certain conditions for construction reasons in the case of the drive apparatus 1 according to the invention, specifically when all actuators 2 which act directly on the swash plate 5 have been moved into a zero-stroke position.

In an embodiment in which a kinematic stroke increase (see explanation further above with regard to FIG. 8) by means of a corresponding ratio between the effective diameter $DW_1$ of the actuators 2 acting on the swash plate 5 and the pitch circle diameter $D_T$ of the swash plate, hereinafter referred to as "swash plate transmission ratio" $i_T$, is dispensed with, that is to say the actuators 2 are arranged directly over the pitch circle diameter $D_T$ of the swash plate 5, the toothing 12 is moved out of engagement when all the actuators 2 which act directly on the swash plate 5 are lifted into a zero-stroke position. Here, the swash bearing is lifted off by half of the actuator stroke h.

Here, the expression "zero-stroke position" means that, in this operating state, the actuators 2 have no working stroke h. By contrast, the expression "full-stroke position", which is likewise used below, means that, in this operating state, the actuators have their full working stroke h.

In the case of the swash plate transmission ratio $i_T$ being used, that is to say in the case of an arrangement of the actuators 2 which act directly on the swash plate 5 on an effective diameter $DW_1$ which is smaller than the pitch circle diameter $D_T$ of the swash plate 5 by a factor of 1.5 to 5, preferably by a factor of 2.5 to 3.5, this effect is self-evidently not realized, because, owing to the swash plate transmission ratio $i_T$, a greater tooth overlap is present.

It is however possible to obtain a good compromise if, in the specification of the modulus m and thus the tooth height $h_Z$ of the toothing 12 of the swash plate 5, the maximum possible swash plate transmission ratio $i_T$ is not fully utilized. Then, a switch of the swash plate gearing into a disconnected state with limited utilization of the swash plate transmission ratio $i_T$ is possible.

A purely exemplary configuration of a swash plate gearing for realizing the disconnect switching function will be described below. The realization of the disconnect switching function necessitates, in the case of a total actuator stroke h for example of 0.36 mm and the resulting tooth stroke $h_T$ of 1.26 mm, a modulus m of the toothing 12 of the swash plate 5 of at most 0.35 mm. If the disconnect switching function is dispensed with, a modulus of 0.5 or 0.6 is possible. The modulus m of 0.35 yields, when all the actuators 2 are fully retracted, an axial air gap between the toothing 12 of the swash plate 5 and the toothing 20 of the drive disk 19 of 0.11 mm. This air gap can be increased by using a special tooth shape (profile offset etc.).

The switching into a disconnected state is realized by virtue of all the actuators 2 being retracted into the zero-stroke position. Here, with corresponding selection of:

modulus m of the toothing 12 and 20
swash plate transmission ratio $i_T$ and
stroke h of the actuators 2, the pairing of the toothings 12, 20 of the swash plate gearing is moved fully out of engagement.

The disconnect switching function accordingly has three switching positions:

the toothing 12 of the swash plate 5 is in engagement, and the actuators 2 are operated with motor action,
the toothing 12 of the swash plate 5 is in engagement and the actuators 2 are operated with generator action,
the toothing 12 of the swash plate 5 is not in engagement.

With a swash plate gearing of such design, it is possible with the drive apparatus 1 according to the invention to realize a wheel hub drive in the case of which, by means of the disconnect switching function, the toothing 12 of the swash plate 5 is in engagement and the actuators 2 are operated with motor action.

Figure 9:
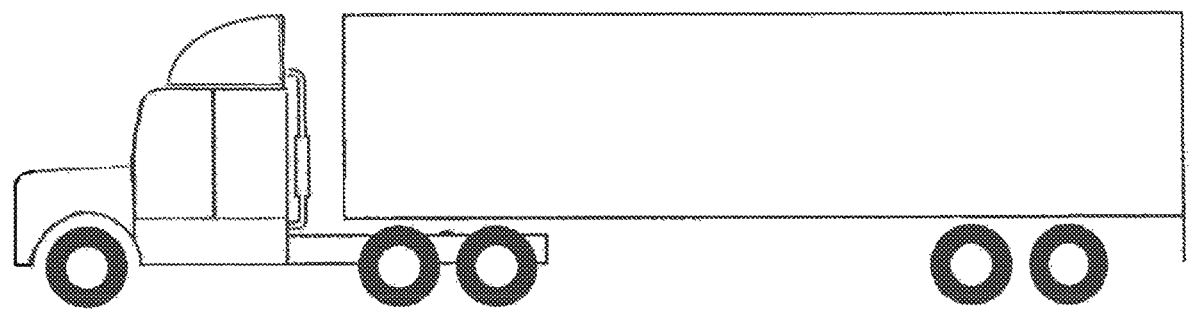
FIG. 9 shows a schematic diagram of a truck-trailer combination of a tractor vehicle (a semitrailer tractor) and a trailer which may be equipped with the exemplary drive apparatus.

This results in an increased overall drive power of a truck-trailer combination (see FIG. 9), which has an advantageous effect in particular on routes with ascending gradients and when increased acceleration is required. Furthermore, driving with purely electric drive is also advantageously possible by means of the drive apparatus 1, for example in order to permit travel in environmental zones in city centers.

The improved traction of a truck-trailer combination (see FIG. 9) in the case of which the wheels of the axles of the at least one trailer vehicle and/or the leading axle and/or the trailing axle of the tractor vehicle and/or of the semitrailer tractor are each equipped with a drive apparatus 1 also has an advantageous effect. In this way, a launch aid can be realized, which has an advantageous effect, in particular inter, with regard to the availability and the driving safety of a truck-trailer combination of said type.

Furthermore, by means of the drive apparatus according to the invention, it is advantageously possible to realize a maneuvering facility of the trailer without a tractor vehicle. In the case of a semitrailer, this is possible in particular by means of a supporting winch for example which has wheels on its free end. As a result of the wheels of the trailer axles being equipped with the drive apparatus 1, the trailer or semitrailer is made automotive, and can thus be moved up to loading ramps without a tractor vehicle, that is to say can be remote-controlled for this purpose.

Furthermore, recuperative braking can be realized by means of the drive apparatus 1 according to the invention. Here, the toothing 12 of the swash plate 5 is in engagement by means of the disconnect switching function, and the actuators 2 are operated with generator action.

In conjunction with an electrical energy store which is arranged in the trailer vehicle and/or in the tractor vehicle and/or in the semitrailer tractor, the kinetic energy of the vehicle can, via the wheels during braking processes and during overrun operation of the truck-trailer combination, be advantageously recovered and stored by means of the drive apparatus 1 according to the invention.

Such a function also has an advantageous effect as a result of the increase of the overall braking power of the truck-trailer combination. Furthermore, by means of the drive apparatus 1, an advantageous, wear-free permanent brake is provided, which under some circumstances renders a retarder superfluous.

Furthermore, it is advantageously possible by means of such a function to prevent the trailer vehicle from running up onto the tractor vehicle or onto the semitrailer tractor.

Likewise, with the drive apparatus 1 according to the invention, it is possible to realize a wheel-selective drive intervention or deceleration intervention. Here, the toothing 12 of the swash plate 5 of the drive apparatus(es) 1 is in engagement by means of the disconnect switching function, by means of which the wheel-selective drive intervention or deceleration intervention is to be realized. The actuators 2 are operated with motor or generator action depending on the desired intervention.

Such a function advantageously yields expanded possibilities for driving stability regulation for the entire truck-trailer combination, for example for an electronic stability program (ESP) which also takes the trailer vehicle operation into consideration.

Furthermore, possibilities arise for decreasing the turning circle of the truck-trailer combination, which has an advantageous effect when traveling around rotary intersections, in particular if, as a result of partial loading or unloading of the truck-trailer combination, the center of gravity of the overall vehicle has been shifted and, accordingly, even traveling around a rotary intersection with the so-called BOKraft [German regulation on the operation of motor carriers in passenger transport] circle dimensions is associated with difficulties.

Finally, with the drive apparatus 1 according to the invention, the swash plate 5 can be moved out of engagement by means of the disconnect switching function, and thus a freewheel function of the drive apparatus 1 can be realized. Here, by means of the disconnect switching function, the toothing 12 of the swash plate 5 is not in engagement.

In this way, during relatively long phases without significant braking interventions, or without situations in which additional drive energy is required or can be advantageously used, the drive apparatus 1 can be protected against excessive wear. Such driving states arise for example on freeway journeys on routes without steep ascending or descending gradients.

Here, it is advantageous that, by means of such a function, an additional driving resistance that would be caused by the engaged toothing 12 of the swash plate 5 is eliminated if the disconnect switching means is in the disconnected switching position.

A particularly advantageous function of the drive apparatus 1 according to the invention is the recuperative braking.

During recuperation operation of the drive apparatus 1, the actuators 2 are compressed in the non-activated, that is to say non-deformed state, whereby an electrical charge is generated which can be dissipated into a store. By contrast to this, during drive operation of the drive apparatus 1, the actuators 2, in the non-deformed state, have an electrical voltage applied thereto, whereby they receive a charge and, as a result, increase in length.

Self-triggering recuperation operation is not possible at least from the disconnected switching state of the drive apparatus 1. Detection of the braking or overrun operation state of the vehicle or of the truck-trailer combination is necessary in order to then, by means of the disconnect switching function, in the non-disconnected switching position, trigger the engagement of the toothing 12 of the swash plate 5 by means of the actuators 2.

Since the swash plate 5 is now driven by the drive disk 19 and a reversal of the force flow direction also between the drive disk 19 and the wheel hub 26 arises in relation to the drive operation of the drive apparatus 1, the drive disk 19 is, by means of the roller-ramp system 27 which acts between the drive disk 19 and wheel hub 26, lifted relative to the wheel hub 26 by approximately the magnitude of the maximum actuator stroke in the direction of a preload of the actuators 2.

Thereafter, automatic recuperation operation is possible, though it may be expedient for the progression of the nutating movement of the swash plate 5 to be stabilized by some of the actuators 2 in possibly cyclic engagement.

Furthermore, by means of variable stroke control of the actuators 2, it is possible, in conjunction with the bell-shaped form of the swash plate 5, to realize, exclusively through corresponding stroke control of the actuators 2, a transmission ratio of the swash plate gearing which differs from that predefined by the toothing parameters.

During the nutating movement of the swash plate 5 during drive operation of the drive apparatus 1, the central axis of the pitch circle diameter $D_T$ of the swash plate 5 performs a revolving movement on a circular path. The radius $R_T$ of said circular path is defined as follows:

actuator stroke (h)/spacing of the actuators 2 from the axis of rotation DA $(DW_1/2)$*spacing of the pivot center S from the point of intersection of the central axis in the toothing plane.

This yields a circular path radius of approximately 1.5 times the actuator stroke h.

The pitch circle $D_T$ of the swash plate 5 thus describes, correspondingly to the eccentric movement, an envelope circle which is enlarged by the above-defined circular path radius, and thus "simulates" a larger pitch circle diameter $D_T$*. This yields a smaller tooth overlap with the drive disk 19.

It is thereby possible, through variation of the actuator stroke h, that is to say through variable stroke control, for the tooth overlap to be set such that the swash plate 5, in a first setting of the variable stroke control, "jumps over" only one tooth during one rotation, and in the case of a second setting, "jumps over" two teeth. A third transmission ratio stage may possibly also be realized.

It would appear realistic that, in the case of for example 301 teeth of the swash plate 5, in the first setting, a transmission ratio of 300:1 is realized, and in the second setting, a transmission ratio of 150:1 is realized. A possible third setting would then yield a transmission ratio of 75:1.

The variable stroke control is configured such that, in all stroke settings, the toothing 12 of the swash plate 5 and the toothing 20 of the drive disk 19 reach an adequate engagement depth in the engagement zone and, on the opposite side, the teeth are moved sufficiently far out of engagement.

The enlargement of the "simulated" pitch circle diameter $D_T$*, caused by the eccentric nutating movement of the bell-shaped swash plate 5, in relation to the actual pitch circle diameter $D_T$ amounts—following the above numerical example—to for example 3 times the actuator stroke h. In the case of an actuator stroke of for example 0.36 mm and a selected modulus m of for example 0.35, it is thus possible, at maximum actuator stroke h, to simulate an enlargement of the swash plate 5 by up to three teeth.

FIG. 2 illustrates a corresponding front view of the drive apparatus 1 according to the invention as per FIG. 1.

It is possible to clearly see the arrangement of the actuators 2 in two groups, in each case on an effective diameter $DW_1$ and $DW_2$ respectively. Here, the actuators 2 are, in each group, arranged with a symmetrical 60° pitch with their longitudinal axes substantially parallel to the axis of the drive apparatus 1. The actuators 2 of the second actuator group are, with respect to the effective diameter $DW_2$ or to the pitch circle, arranged so as to be rotationally offset by in each case 30° in relation to the actuators 2 of the first actuator group in the actuator housing 7. The effective diameter $DW_1$ of the actuator arrangement is in this case selected such that the pitch circle diameter of the toothing 8 of the swash plate 5 is undershot in terms of magnitude.

The function of the drive apparatus 1 is ensured by virtue of the fact that the in this case six or twelve and at least three actuators 2 arranged substantially parallel to the axis of the drive shaft 15 act, at the effective diameter $DW_1$, on the swash plate 5 which is secured against rotation. In the case of periodic actuation, preferably actuation which is periodic in accordance with a sinusoidal function which is phase-offset in each case by 120°, of the actuators 2 of the two actuator groups, a nutating movement about the kinematic pivot center S, which sets the drive disk 19 in rotation, is generated by alternating dilation and contraction of the actuators 2. This is also illustrated particularly clearly in FIG. 8.

FIG. 3 illustrates a longitudinal sectional view of a design variant of a drive apparatus 10 according to the invention. FIG. 4 shows a corresponding front view of the design variant as per FIG. 3.

Below, in order to avoid repetitions, only deviations or changes and additions in relation to the above-described design variant of a drive apparatus 1 according to the invention as per FIG. 1 and FIG. 2 will be described.

By contrast to the design variant of the drive apparatus 1 as per FIG. 1 and FIG. 2, the design variant of the drive apparatus 10 as per FIG. 3 has a spring element between the base of the stepped bore 13 of the swash plate 5 and the component 15a with spherical-sector-shaped geometry, which spring element is in this case, purely by way of example, designed as a plate spring 36. The plate spring 36 is supported on the base of the stepped bore 13 of the swash plate 5 and acts with its spring force against the component 15a with spherical-sector-shaped geometry. Furthermore, the drive apparatus 10 has a ring 42 between the component 15a with spherical-sector-shaped geometry and the plate spring 36.

An enlarged detail of said section of the drive apparatus 10 is illustrated in FIG. 7.

Owing to the plate spring 36 and the ring 42, it is no longer necessary for the component 15a with spherical-sector-shaped geometry to be classed in different tolerance classes, or for the component 15a to be installed with adjustment washers, because the tolerances are advantageously compensated by means of the plate spring 36. This permits greatly simplified and thus inexpensive manufacture and installation of the component 15a with spherical-sector-shaped geometry.

Furthermore, the plate spring 36 assists the realization of the disconnect switching function. The realization of the disconnect switching function necessitates, in the case of a total actuator stroke h of 0.36 mm and the resulting tooth stroke $h_T$ of 1.26 mm, a modulus m of the toothing 12 of the swash plate 5 of at most 0.35. If the disconnect switching function is dispensed with, a modulus of 0.5 or 0.6 is possible. The modulus of 0.35 yields, when all the actuators 2 are fully retracted and the swash plate 5 is adjusted back by the plate spring 36 arranged between the swash bearing and the swash plate 5, an axial air gap between the toothing 12 of the swash plate 5 and the toothing 20 of the drive disk 19 of 0.11 mm. This air gap or clearance can be increased by using a special tooth shape (profile offset etc.) for both toothings 12, 20.

The clearance of 0.11 mm determined in the abovementioned example is obtained as follows: the overlap of the teeth of the toothing 12 of the swash plate 5 and of the toothing 20 of the drive disk 19 amounts to 2 times the modulus m, that is to say 0.7 mm in the case of a modulus m of 0.35.

In the maximum pivoted position of the swash plate 5, the toothing 12 on one side has been engaged to 0.7 mm overlap and, on the opposite side, in the case of the maximum stroke of 1.26 mm, there is a clearance of 0.56 mm (1.26 minus 0.7). If the deployed actuators 2 are now likewise retracted, although the side which is deployed to a great extent pivots back, the maximally retracted side however pivots to the same extent, which would result in a central position of the swash plate 5. In said central position, a stroke of 50% of the maximum stroke h is present, that is to say 0.63 mm. Said central position corresponds to an actuator stroke of 0.18 mm. However, the actuators 2 are in fact each retracted by 0.36 mm. Without plate spring 36, this would thus yield a gap of 0.18 mm between the abutment surfaces of the actuators 2 on the swash plate 5. With the force of the plate spring 36, the swash plate 5 is however moved back by said 0.18 mm and placed in contact with the actuators 2 under preload. The entire return movement now amounts to 0.63 mm+0.18 mm=0.81 mm, whereby the mentioned clearance of 0.11 mm is achieved.

The restoring force of the plate spring 36 is, for the realization of the clearance function, selected to be of such a magnitude that the housing 3 of the actuators 2 designed without slots and thus without spring function can be omitted. The preload of the actuators 2 is selected to be 5 to 15 MPa. For six actuators 2 each with a cross-sectional area of 200 mm², this thus yields a preload force of 6000 N to 18,000 N. For the realization of the elastic restoring action, what would appear suitable is for example a plate spring 36 conforming to DIN 2093 series B, outer diameter 80 mm, inner diameter 41 mm, leaf thickness t=3 mm, curvature height ho=2.3 mm. Said plate spring 36, in the case of a spring travel of $s_0$=0.75*ho=1.725 mm, has a spring force of 10,500 N and, at s=1.545 mm, a spring force of approximately 9400 N. By means of a smaller preload, said plate spring 36 can also be set for lower overall spring forces. The use of a special design of the plate spring 36 which deviates from the standard dimensions, for example with a smaller leaf thickness, is likewise possible.

In the case of non-activated actuators 2, the plate spring 36 relaxes until all actuators 2 have been pushed into their zero-stroke position and, by the remaining force of the plate spring 36, are held in said position under the predefined preload force.

In the operating state of the actuators 2, the plate spring 36 is pushed by the force of the actuators 2 into a predefined, unchanging abutment position which permits the complete working stroke h of the actuators 2. Here, with the first working stroke of the actuators 2, the idle travel is overcome counter to the force of the plate spring 36. Since the abutment position is thereafter held constant, no further loss of work of the actuators 2 occurs.

Since the two stroke positions are for example 0.18 mm apart from one another, very precise setting of the actuators 2 is required. This is preferably realized by means of two stops which are defined by a settable gap. The setting of the gap may advantageously be performed through the positioning of the ring 42 and the subsequent fixing thereof in the stepped bore 13 of the swash plate 5, for example by means of a laser welding process or electron beam welding process.

By means of the plate spring 36, the function of the recuperative braking is also realized differently than in the exemplary embodiment as per FIGS. 1 and 2. Since, during the recuperative braking, the swash plate 5 is driven by the drive disk 19 and a reversal of the force flow direction also arises between the drive disk 19 and the wheel hub 26 thus arises in relation to the drive mode, the drive disk 19 is, by means of the roller-ramp system 27 which acts between the drive disk 19 and wheel hub 26, lifted relative to the wheel hub 26 by approximately the magnitude of the maximum actuator stroke h in the direction of a preload of the actuators 2. Here, the spring travel of the preload of the plate spring 36 is overcome, such that the drive movement of the swash plate 5 acts directly on the actuators 2. Thereafter, no automatic recuperation operation is possible if the actuators 2 react only with generator action. The nutating movement of the swash plate 5 must be generated actively, that is to say by motor action, at least by some of the actuators 2. The electrical energy that is used here may then additionally be recovered again in a phase in which at least some of the actuators 2 operate with generator action.

The pitch circle diameter difference $\Delta D_T$, caused by the eccentric nutating movement of the bell-shaped swash plate 5, between the actual pitch circle diameter $D_T$ of the toothing 12 of the swash plate 5 and the pitch circle diameter $D_A$ of the toothing 20 of the drive disk 19 amounts to 3 times the actuator stroke h. In the case of an actuator stroke h of 0.36 mm and a selected modulus of 0.35 for the toothing 12 of the swash plate 5, it is thus possible, at maximum actuator stroke h, to simulate a reduction in the number of teeth of the toothing 12 of the swash plate 5 by up to three teeth.

The practical possibility of realizing a stepped switching function necessitates adaptation measures on the swash bearing and on the swash plate 5, on the drive disk 19 and in the actuation of the actuators 2.

For a stepped switching function, as mentioned above, at least two different stroke positions are required for the swash plate 5, wherein, however, the tooth engagement depth must remain constant. That is to say, the maximum stroke position is equal for all switching stages, and the minimum stroke position is varied. A problem exists in the fact that, owing to the fixed position of the pivot center S, a defined maximum stroke position always yields a defined, unchanging minimum stroke position on the opposite side of the swash plate 5.

To solve this problem, it is necessary for the position of the pivot center S or alternatively the axial position of the drive disk 19 relative to the swash plate 5 to be designed to be variable for the different switching stages.

To solve the problem, the following possibilities are conceivable:

The position of the pivot center S is defined not by the kinematic relationships of the swash gearing including swash bearing but exclusively by the stroke position of the actuators 2, that is to say the position of the pivot center S is determined not by the structurally defined kinematic relationships of the swash gearing but by means of corresponding actuation of the actuators 2 by means of a corresponding program in the control or regulation of the drive apparatus. In this case, only one bearing is required for the transverse guidance of the swash plate 5.

In the case of the actuators 2 being arranged directly over the pitch circle $D_T$ of the toothing 12 of the swash plate 5, this would be easy to realize. A disadvantage of such a solution is the small achievable toothing stroke $h_T$ of the swash plate 5. The actuators 2 situated on the opposite side of the swash plate 5 must, in the case of pressure actuation of one side for the purposes of setting the nutating movement, impart a relatively high tensile force, whereby the possible actuator force is reduced to the same extent.

In a further possibility for solving the problem, the drive disk 19 is, by means of a mechanical adjustment device (not illustrated here), varied in terms of its axial position relative to the swash plate 5 in the individual switching stages. For this change in position in the range of up to 0.5 mm, a special actuator (not illustrated here) and corresponding actuation are required.

Finally, the axial position of the swash plate 5 may also be varied by means of the actuation of the actuators 2. For this purpose, a spring element, in this case for example in the form of a plate spring 36, rather than an adjustment disk is arranged between the component 15a with spherical-sector-shaped geometry and the swash plate 5. Alternatively, it is for example also possible for an ondular washer to be used as a spring element. In this respect, this solution advantageously follows the same structural design as the disconnect switching function described further above according to the design variant of the drive apparatus 1 as per FIGS. 3, 4 and 7.

The spring element or the plate spring 36 holds the swash bearing under preload at all times, and at the other side presses the swash plate 5 against the actuators 2 with the same force. It is ideally thereby possible for the preloading of the actuators 2 by means of the housing 3 with slots 4 to be reduced or omitted entirely. Switching in two switching stages may be realized by means of two stroke positions of the swash plate 5 with respect to the component 15a with spherical-sector-shaped geometry.

For the relatively small transmission ratio, the plate spring 36 is expanded as far as an upper limit stroke position. Here, the swash plate 5 assumes the stroke position which permits a maximum pivot angle of the swash plate 5.

Here, the toothing stroke $h_T$ of the swash plate 5 is, depending on the embodiment, of such a magnitude that the drive disk 19 is rotated further by 2 or 3 teeth per cycle of the nutating movement.

For a relatively high transmission ratio, the plate spring 36 is compressed by the actuator force until the swash plate has reached a lower abutment position on the component 15a with spherical-sector-shaped geometry. The toothing stroke $h_T$ of the swash plate 5 is in this case reduced to such an extent that the drive disk is rotated further by only one tooth per cycle of the nutating movement.

In this switching position, the actuator stroke h is not fully utilized. The actuators 2 reach neither a full-stroke position nor the zero-stroke position, but are rather operated in a middle stroke range which is reduced by approximately one third in relation to the full actuator stroke "h". In this case, only approximately 80% of the working capacity of the actuators 2 is utilized. However, since a transmission ratio of the swash gearing which is higher by a factor of 2 or 3 is made possible as a result of the stepped switching function, depending on the transmission ratio realized, a corresponding increase of the attainable drive torque of the drive apparatus 1 is nevertheless obtained.

The different stroke positions with regard to the toothing stroke "$h_T$" of the swash plate 5 are realized by virtue of the preload force and the abutment positions of the spring element or of the plate spring 36 and the different actuating forces of the actuators 2 in the respective switching stages being adapted to one another.

In the case of the relatively high transmission ratio (the drive disk 19 is rotated further by one tooth per rotation of the swash plate 5), the actuators 2 are not moved back into the zero-stroke position during the return stroke. That is to say, the actuators 2, even in the phase in which that part of the swash plate 5 which is assigned to said actuators 2 does not require an actuator force, still generate an actuator force in order to hold the stroke position.

The forces acting centrally on the swash bearing and thus also on the spring element or the plate spring 36 are thus relatively high. The centrally acting force, which is made up of the sum of all acting actuator forces, may also be set to a predefined magnitude. If the forces on that side of the swash plate 5 which does not exhibit toothing engagement are selected to be higher, it is necessary, in order to maintain the desired drive torque of the drive apparatus 1, to increase, by the same magnitude, the force level of the actuators 2 on that side of the swash plate 5 which does exhibit toothing engagement.

The magnitude of the centrally acting force is in this case increased without changing the drive conditions. The spring element or the plate spring 36 is configured for this transmission ratio of the stepped switching function (the drive disk 19 is rotated further by one tooth per rotation of the swash plate 5) such that the actuator forces acting centrally on the swash bearing compress the spring element or the plate spring 36 until the swash plate 5 has reached the lower abutment on the component 15a with spherical-sector-shaped geometry of the swash bearing.

In the case of a smaller transmission ratio (the drive disk 19 is rotated further by two or more teeth per rotation of the swash plate 5), the actuator forces on that side of the swash plate 5 which exhibits toothing engagement are unilaterally high, and by contrast, on that side of the swash plate 5 which does not exhibit toothing engagement, the actuator forces tend to zero.

Thus, the forces acting centrally on the swash bearing are also relatively low. The spring characteristic curve of the spring element or of the plate spring 36 is configured for this state such that the acting actuator forces do not overcome the spring force, such that the spring element or the plate spring 36 relaxes until the swash plate 5 has reached the upper stroke position.

FIG. 5 illustrates a longitudinal sectional view of a further design variant of a drive apparatus 100 according to the invention. FIG. 6 shows a corresponding front view of the further design variant as per FIG. 5.

Below, in order to avoid repetitions, only deviations or changes and additions in relation to the above-described design variant of a drive apparatus 100 according to the invention as per FIG. 3 and FIG. 4 will be described.

For an improved dissipation of heat, the drive apparatus 100 has a cooling air guide to the actuator housing 7 from the outside, that is to say through openings 41 through the protective cap 34.

For the thus required sealing of the head part 9 of the central bolt 10, the drive apparatus 100 has a seal 37 which surrounds the head part 9, which seal is fastened to the actuator housing 7, for example to one of the cooling fins 11 of the actuator housing 7. Under said seal 37, a cabling of the actuators 2 is also led from the passage bore 32 of the central bolt 10 to the contact points of the actuators 2. The fastening of the seal may be detachable in order to permit accessibility to the central bolt 10 during assembly and in the event of servicing.

To seal off the actuator housing 7 on its side facing toward the swash plate 5, and the swash plate gearing, including the bearing points 22, 23, 25, 27, 28, with respect to the surroundings, the drive apparatus 1 has a disk-shaped seal 38. The disk-shaped seal 38 has, on its wheel-hub-side circumference, a seal bead 39 by means of which the seal 38 is fixed between the wheel hub 26 and the protective cap 34. The disk-shaped seal 38 likewise has, on its actuator-housing-side circumference, a seal bead 40 by means of which the seal 38 is fixed between the actuator housing 7 and the swash plate 5. A design of the seal 38 as a diaphragm-like seal, which is produced for example from a fabric-reinforced elastomer, is particularly advantageous. In this way, relative movements between wheel hub 26 and actuator housing 7 can be compensated by means of the seal 38.

To ensure a cooling air flow caused by relative wind and thermal effects, the protective cap 34 has a multiplicity of openings 41. Here, the cooling air flows around the actuator housing 7, which on its outer wall has means for heat dissipation, such as for example cooling fins 11. On that side of the protective cap 34 which is averted from the air inlet, the cooling air emerges again through the openings 41 in the protective cap 34.

For protection against coarse dirt and against spray and splash water, it is provided that the openings 41 are designed such that sufficient cooling air enters but coarse dirt and spray and splash water are however repelled. This may be realized for example by means of a gill-like design of the openings 41 (not illustrated here).

The invention is not restricted to the exemplary embodiments described above, but may self-evidently be modified within the scope of the claims.

LIST OF REFERENCE DESIGNATIONS

1, 10, 100 Drive apparatus
2 Actuator
3 Housing
4 Slot
5 Swash plate
6 Rear face wall
7 Actuator housing
8 Front face wall
9 Head part
10 Central bolt
11 Cooling fins
12 Toothing (swash plate)
13 Stepped bore (swash plate)
14 Supporting column
15 Component with spherical-sector-shaped geometry
16 Spur toothing (swash plate)
17 Spur toothing (anchor plate)
18 Anchor plate
19 Drive disk
20 Toothing (drive disk)
21 Spherical-sector-shaped depression
22 Bearing cage
23 Rolling bearing ball
24 Stepped bore (drive disk)
25 Rolling bearing
26 Wheel hub
27 Roller-ramp system
28 Tapered-roller bearing
29 Threaded section
30 Threaded bore
31 Axle body
32 Passage bore
33 Shank
34 Protective cap
35 Wheel hub housing
36 Plate spring
37 Seal
38 Seal
39 Seal bead
40 Seal bead
41 Opening
42 Ring
A Spacing
DA Axis of rotation
DW Effective diameter
$D_T$ Pitch circle diameter, swash plate
$D_{T*}$ "Simulated" pitch circle diameter of the swash plate
$D_A$ Pitch circle diameter, drive disk
$\Delta D_T$ Pitch circle diameter difference, swash plate
$f_{max}$ Maximum nutation frequency
$f_n$ Rotational speed
h Working stroke, actuator
$h_T$ Toothing stroke, swash plate
$h_Z$ Tooth height
$i_T$ Swash plate transmission ratio
K Force action point
m Modulus
$M_{max}$ Maximum torque of the drive apparatus
$M_{Rt}$ Theoretical wheel torque
$M_R$ Wheel torque
$n_{max}$ Maximum drive rotational speed of the drive apparatus
r Radius
R Radius
$R_1$ Radius
$R_{dyn}$ Dynamic wheel rolling diameter
$R_T$ Radius
S Pivot center
$T_{ZAB}$ Pitch circle plane
$U_A$ Circumference of drive disk
$U_T$ Circumference of swash plate
$\Delta U_T$ Circumference difference, swash plate
v Driving speed
$W_{UG}$ Working capacity per rotation
$W_0$ Working capacity per stroke
$W_G$ Total work
$z_{max}$ Number of teeth of the drive disk

What is claimed is:

1. A drive apparatus with recuperation capability for generating a rotational movement for a vehicle, comprising:
 a hub direct drive, wherein
 the hub direct drive comprises an electric machine which operates in accordance with a piezoelectric operating principle,
 the drive apparatus has at least three actuators which operate in accordance with the piezoelectric operating principle and which are arranged with a 120° pitch on an effective diameter DW, and
 the at least three actuators have in each case one housing.

2. The drive apparatus as claimed in claim 1, wherein the housing has slots in a radial circumferential direction.

3. The drive apparatus as claimed in claim 1, wherein the drive apparatus has two groups of actuators with in each case at least three actuators.

4. The drive apparatus as claimed in claim 3, wherein the actuators of the first group have an opposite direction of action to the second group of actuators.

5. The drive apparatus as claimed in claim 3, wherein the at least three actuators of the first group are arranged with a 120° pitch, and the actuators of the second group, which are likewise arranged with a 120° pitch, are offset by 60° in relation to the actuators of the first group.

6. The drive apparatus as claimed in claim 3, wherein the two groups of actuators with in each case at least three actuators are inserted in an actuator housing.

7. The drive apparatus as claimed in claim 6, wherein the actuator housing has cooling fins on an outer wall.

8. The drive apparatus as claimed in claim 6, wherein the actuator housing surrounds the actuators radially in each case in the manner of a housing and axially at in each case one end of the actuators.

9. The drive apparatus as claimed in claim 6, wherein the actuator housing is extended through by a supporting column.

10. The drive apparatus as claimed in claim 9, wherein the supporting column is extended through by a central bolt.

11. The drive apparatus as claimed in claim 10, wherein the central bolt has a head part.

12. The drive apparatus as claimed in claim 11, wherein the central bolt has a shank, a threaded section and a passage bore.

13. The drive apparatus as claimed in 11, wherein the drive apparatus has a seal which surrounds the head part and Which is fastened to the actuator housing.

14. The drive apparatus as claimed in claim 10, wherein the actuator-force-conducting components are subjectable to a preload by way of the central bolt.

15. The drive apparatus as claimed in claim 10, wherein the central bolt is made from a tempering steel of quality 10.9 or 12.9.

16. The drive apparatus as claimed in claim 9, wherein the supporting column is made from a technical ceramic material.

17. The drive apparatus as claimed in claim 9, wherein the supporting column is made from silicon carbide (SiC).

18. The drive apparatus as claimed in claim 6, wherein the actuator housing is made from a material with low density and high modulus of elasticity.

19. The drive apparatus as claimed in claim 6, wherein the actuator housing is made from a technical ceramic material.

20. The drive apparatus as claimed in claim 19, wherein the actuator housing is made from silicon carbide (SiC).

21. The drive apparatus as claimed in claim 3, wherein the drive apparatus has a swash plate.

22. The drive apparatus as claimed in claim 21, wherein the actuators of the first group act directly, and the actuators of the second group act indirectly, on the swash plate.

23. The drive apparatus as claimed in 22, wherein the actuators of the second group act directly, and the actuators of the first group act indirectly, on a head part of the central bolt.

24. The drive apparatus as claimed in claim 23, wherein the actuators act periodically on the head part of the central bolt.

25. The drive apparatus as claimed in claim 24, wherein the actuators act periodically on the head part of the central bolt in accordance with a sinusoidal function which is phase-offset by 120°.

26. The drive apparatus as claimed in claim 22, wherein the actuators of the second group are actuated, in relation to a phase position of the actuation of the actuators of the first group, so as to yield a maximum overlap of the strokes of the actuators.

27. The drive apparatus as claimed in claim 22, wherein the actuators of the second group are actuated, in relation to the phase position of the actuation of the actuators of the first group, so as to yield a maximum action of force of the actuators on the swash plate.

28. The drive apparatus as claimed in claim 22, wherein the swash plate has a toothing.

29. The drive apparatus as claimed in claim 28, wherein the swash plate has a spur toothing.

30. The drive apparatus as claimed in claim 28, wherein the drive apparatus has a drive disk.

31. The drive apparatus as claimed in claim 30, wherein the drive disk has a toothing.

32. The drive apparatus as claimed in claim 31, wherein the toothing of the swash plate interacts or meshes with the toothing of the drive disk.

33. The drive apparatus as claimed in claim 32, wherein the toothing of the swash plate and the toothing of the drive disk have a modulus of 0.25 to 0.7.

34. The drive apparatus as claimed in claim 30, wherein the drive apparatus has an anchor plate.

35. The drive apparatus as claimed in claim 34, wherein the anchor plate has a spur toothing.

36. The drive apparatus as claimed in claim 35, wherein a spur toothing of the swash plate geometrically corresponds to the spur toothing of the anchor plate.

37. The drive apparatus as claimed in 34, wherein the drive apparatus has a pivot bearing between the swash plate and the drive disk.

38. The drive apparatus as claimed in claim 37, wherein the pivot bearing involves rolling contact.

39. The drive apparatus as claimed in claim 38, wherein the rolling contact is formed by: a component with spherical-sector-shaped geometry, which is inserted into a stepped bore of the swash plate, and a spherical-sector-shaped depression of the drive disk, between which there is arranged a bearing cage in which rolling bearing balls are held.

40. The drive apparatus as claimed in claim 39, wherein the drive apparatus has a spring element between the base of the stepped bore of the swash plate and the component with spherical-sector-shaped geometry.

41. The drive apparatus as claimed in claim 40, wherein the spring element is a plate spring.

42. The drive apparatus as claimed in claim 41, wherein the plate spring is supported on the base of the stepped bore of the swash plate and acts with its spring force against the component with spherical-sector-shaped geometry.

43. The drive apparatus as claimed in claim 41, wherein the drive apparatus has a ring between the component with spherical-sector-shaped geometry and the plate spring.

44. The drive apparatus as claimed in claim 30, wherein a transmission of torque between the drive disk and a wheel hub is realized via a freewheel-like roller-ramp system.

45. The drive apparatus as claimed in claim 44, wherein a part of the wheel hub which accommodates the drive apparatus is covered toward the outside by a protective cap.

46. The drive apparatus as claimed in claim 45, wherein the protective cap is connected to a wheel hub housing.

47. The drive apparatus as claimed in claim 45, wherein the protective cap has openings.

48. The drive apparatus as claimed in claim 30, wherein the drive apparatus has a disk-shaped seal which seals off the actuator housing on its side facing toward the swash plate, and a swash plate gearing formed from the swash plate and the drive disk, and hearing points, with respect to the surroundings.

49. The drive apparatus as claimed in claim 48, wherein the disk-shaped seal has, on its wheel-hub-side circumference, a seal bead by which the seal is fixed between the wheel hub and the protective cap.

50. The drive apparatus as claimed in claim 48, wherein the disk-shaped seal has, on its actuator-housing-side circumference, a seal bead by which the seal is fixed between the actuator housing and the swash plate.

51. The drive apparatus as claimed in claim 22, wherein the swash plate is formed as a composite component.

52. The drive apparatus as claimed in claim 22, wherein the swash plate has a swash plate body which is made from glass-fiber-reinforced plastic (GRP).

53. The drive apparatus as claimed in claim 21, wherein the actuators act periodically on the swash plate.

54. The drive apparatus as claimed in claim 53, wherein the actuators act periodically on the swash plate in accordance with a sinusoidal function which is phase-offset by 120°.

55. The drive apparatus as claimed in claim 1, wherein the drive apparatus has a disconnect switching function.

56. The drive apparatus as claimed in claim 55, wherein functions of drive, recuperative braking and freewheeling of the drive apparatus are realized by the disconnect switching function.

57. The drive apparatus as claimed in claim 1, wherein the drive apparatus has a stepped switching function.

58. The drive apparatus as claimed in claim 57, wherein the stepped switching function acts on swash plate gearing, wherein the swash plate gearing is formed from a swash plate and a drive disk, and realizes at least two transmission ratio stages of the swash plate gearing.

59. A tractor vehicle or semitrailer tractor, wherein wheels of a leading axle and/or wheels of a trailing axle have a drive apparatus as claimed in claim 1.

60. The tractor vehicle or semitrailer tractor as claimed in claim 59, wherein
the tractor vehicle or the semitrailer tractor has an energy store in which energy obtained by recuperative braking via the drive apparatus is stored and from which stored energy is released for drive of the tractor vehicle or of the semitrailer tractor by way of the drive apparatus.

61. A trailer vehicle, wherein wheels of trailer vehicle axles of the trailer vehicle have a drive apparatus as claimed in claim 1.

62. The trailer vehicle as claimed in claim 61, wherein the trailer vehicle has an energy store in which energy obtained by recuperative braking via the drive apparatus is stored and from which stored energy is released for drive of the trailer vehicle by way of the drive apparatus.

63. A truck-trailer combination comprising a tractor vehicle or a semitrailer tractor and at least one trailer vehicle, wherein one or both of the vehicles has a drive apparatus as claimed in claim 1.

* * * * *